US012084327B2

(12) United States Patent
Rodewald et al.

(10) Patent No.: US 12,084,327 B2
(45) Date of Patent: Sep. 10, 2024

(54) VEHICLE LIFT APPARATUS AND METHOD

(71) Applicant: RDR Services LLC, Lake City, MN (US)

(72) Inventors: Joshua Rodewald, Lake City, MN (US); Dennis Rodewald, Phillips, WI (US)

(73) Assignee: FREEDOM VEHICLE LIFTS, LLC, Lake City, MN (US)

( * ) Notice: Subject to any disclaimer, the term of this patent is extended or adjusted under 35 U.S.C. 154(b) by 0 days.

(21) Appl. No.: 17/867,190

(22) Filed: Jul. 18, 2022

(65) Prior Publication Data

US 2023/0016375 A1 Jan. 19, 2023

Related U.S. Application Data

(60) Provisional application No. 63/341,507, filed on May 13, 2022, provisional application No. 63/222,755, filed on Jul. 16, 2021.

(51) Int. Cl.
*B66F 7/14* (2006.01)
*B66F 7/28* (2006.01)

(52) U.S. Cl.
CPC . *B66F 7/14* (2013.01); *B66F 7/28* (2013.01)

(58) Field of Classification Search
CPC .......... B66F 7/0608; B66F 7/065; B66F 7/14; B66F 7/28; F16H 25/2021
See application file for complete search history.

(56) References Cited

U.S. PATENT DOCUMENTS 4,635,904 A * 1/1987 Whittingham ............ B60S 9/08 192/56.62
5,156,238 A 10/1992 Matthews
5,340,082 A 8/1994 Holloway
7,014,012 B2 3/2006 Baker
8,141,851 B2 3/2012 Manev et al.
8,991,626 B2 3/2015 Crain et al.
9,598,271 B2 3/2017 Kritzer
9,884,751 B2 2/2018 Jaipaul
11,027,952 B2 6/2021 Luinge
11,174,139 B2 11/2021 Stapensea et al.
2003/0075657 A1* 4/2003 Joubert ................... B66F 7/065 254/9 C
2003/0091417 A1 5/2003 Swann (Continued)

FOREIGN PATENT DOCUMENTS

CN 107352459 A * 11/2017 ............ B66F 7/0658
CN 111776984 A * 10/2020 ............ B66F 7/0608

(Continued)

OTHER PUBLICATIONS

Machine Translation of CN 111776984.*

*Primary Examiner* — Diem M Tran
(74) *Attorney, Agent, or Firm* — Taft Stettinius & Hollister LLP; Derek B. Lavender

(57) ABSTRACT

A vehicle lift assembly having an input shaft, a first ball screw coupled to rotate with the input shaft, a ball screw nut coupled to a first bracket and configured to selectively move a lifting member based on rotation of the first ball screw, and a power unit coupled to the input shaft, the power unit having a wireless transponder and configured to be selectively powered based on wireless signals received by the transponder from a remote device.

5 Claims, 20 Drawing Sheets

(56) References Cited

U.S. PATENT DOCUMENTS

| | | | | |
|---|---|---|---|---|
| 2016/0229244 | A1* | 8/2016 | Drake | B60D 1/66 |
| 2017/0137265 | A1 | 5/2017 | Menville | |
| 2020/0055714 | A1 | 2/2020 | Jaipaul et al. | |

FOREIGN PATENT DOCUMENTS

| | | | | |
|---|---|---|---|---|
| CN | 111891968 | A | * | 11/2020 |
| JP | H0470474 | A | * | 3/1992 |
| KR | 20100138329 | A | * | 12/2010 |

* cited by examiner

VEHICLE LIFT APPARATUS AND METHOD

CROSS-REFERENCE TO RELATED DISCLOSURES

The present disclosure claims the benefit of U.S. Provisional Application No. 63/341,507 filed on May 13, 2022 and U.S. Provisional Application No. 63/222,755 filed on Jul. 16, 2021, the disclosures of which are hereby incorporated herein in entirety.

FIELD OF THE DISCLOSURE

The present disclosure relates to a lift assembly configured to at least partially lift vehicles off the ground for service, and more specifically to a lift assembly that can be engaged with w cordless power unit. The lift assembly is directed towards vehicles to be lifted from the ends or sides, allowing for maintenance to be done outside and under the vehicle, such as wheel replacement, transmission repair, etc.

BACKGROUND OF THE DISCLOSURE

Currently a multiplicity of lift products exist which can lift vehicles and typically rely on an external source for primary lifting power such as Pneumatic (Air Pressure), Hydraulic, or Electric. There is a need for a product that offers optional attachments which allow for lifting a vehicle from a variety of positions and locations or that has a self-contained power source among other things.

SUMMARY

One embodiment of this disclosure is a vehicle lift assembly having a base with at least one support leg, a mast extending from the base, a guided carriage movably coupled to the mast to selectively slide along the mast, at least one lifting member coupled to the carriage and extending away from the carriage, a ball screw and nut assembly at least partially defined in the mast, the ball screw and nut assembly having a ball bearing nut coupled to the guided carriage and configured to selectively travel linearly along a ball screw. Rotation of the ball screw selectively moves the guided carriage and lifting member along the mast. Further, the ball screw is configured to be selectively rotatable with a portable device so that the vehicle lift assembly is functional without being tethered to an external power source.

In one example of this embodiment, the support leg is pivotable about the base between a transport position wherein the support leg is at least partially aligned with the mast and a deployed position wherein the support leg is about perpendicular to the mast. In part of this example, the lifting member has a lift arm, the lift arm being pivotable to be at least partially aligned with the mast in the transport position. The lift arm is also pivotable about an arm axis in the deployed position. Further still, the lift arm is telescopically extendable.

In another example of this embodiment, the lifting member has a first lift arm and a second lift arm each pivotally coupled to the guided carriage to be at least partially aligned with the mast in the transport position and pivotable about an arm axis in the deployed position. In part of this example each of the first lift arm assembly and the second lift arm assembly are telescopically extendable.

Another example of this embodiment includes a locking mechanism that prevents the guided carriage from travelling to a lowered position when the locking mechanism is engaged. In one part of this example the locking mechanism is an anti-reversing mechanism positioned about the ball screw. In another part of this example the locking mechanism is a ratcheting locking mechanism positioned at least partially between the guided carriage and the mast to selectively prevent the guided carriage from travelling down the mast towards the base.

Yet another example of this embodiment has an anti-reversing mechanism positioned about the ball screw and a ratcheting locking mechanism positioned at least partially between the guided carriage and the mast wherein the guided carriage is selectively prevented from travelling down the mast to the base with either or both of the anti-reversing mechanism and the ratcheting locking mechanism.

Another example of this embodiment has an input shaft that selectively rotates the ball screw, the input shaft is sized to be coupleable to a handheld cordless drill. In part of this example, the input shaft is oriented about ninety degrees from the ball screw. Another part of this example has a power unit coupled to the input shaft, the power unit configured to selectively rotate the input shaft. Further, the power unit has a battery and a wireless transponder to selectively alter the position of the carriage relative to the mast based on wireless signals identified by the transponder from a wireless remote control. In one aspect of this part, the transponder is configured to respond to wireless signals from a smart phone.

In yet another example of this embodiment the lifting member has a bumper lift assembly configured to engage a bumper of a vehicle. In part of this example the bumper lift assembly comprises extendable bumper couplers that are extendable relative to the guided carriage along longitudinal direction to accommodate bumpers of different heights.

Yet another embodiment of this disclosure is a vehicle lift assembly that has an input shaft, a first ball screw coupled to rotate with the input shaft, a ball screw nut coupled to a first bracket and configured to selectively move a lifting member based on rotation of the first ball screw, and a power unit coupled to the input shaft, the power unit having a wireless transponder and configured to be selectively powered based on wireless signals received by the transponder from a remote device.

One example of this embodiment has a first gear box configured to transfer rotary motion from the input shaft to a first output coupled to the first ball screw and a second output coupled to a second ball screw, a first lift base and a second lift base each having slots defined longitudinally along inner walls, the first bracket coupled to a first ball bearing nut such that rotary motion of the first ball screw moves the first bracket to raise or lower a first support, and a second bracket coupled to a second ball bearing nut such that rotary motion of the second ball screw moves the second bracket to raise or lower a second support. One part of this example has a second gear box coupled to an auxiliary output of the first gear box and configured to transfer rotary motion from the auxiliary output to a third output coupled to a third ball screw and a fourth output coupled to a fourth ball screw, a third bracket coupled to a third ball bearing nut such that rotary motion of the third ball screw moves the third bracket to raise or lower a third support, and a fourth bracket coupled to the fourth ball bearing nut such that rotary motion of the fourth ball screw moves the fourth bracket to raise or lower a fourth support.

In one aspect of this example, the first and second gear boxes are coupled to one another to substantially simultaneously rotate the corresponding ball screws at the same rate based on the rotation of the input shaft.

Another example of this embodiment has an anti-reversing locking mechanism that selectively prevents the lifting member from lowering. Part of this example has a secondary locking mechanism to selectively prevent the lifting member from lowering.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals indicate corresponding parts throughout the several views.

DETAILED DESCRIPTION

Figure 1A:
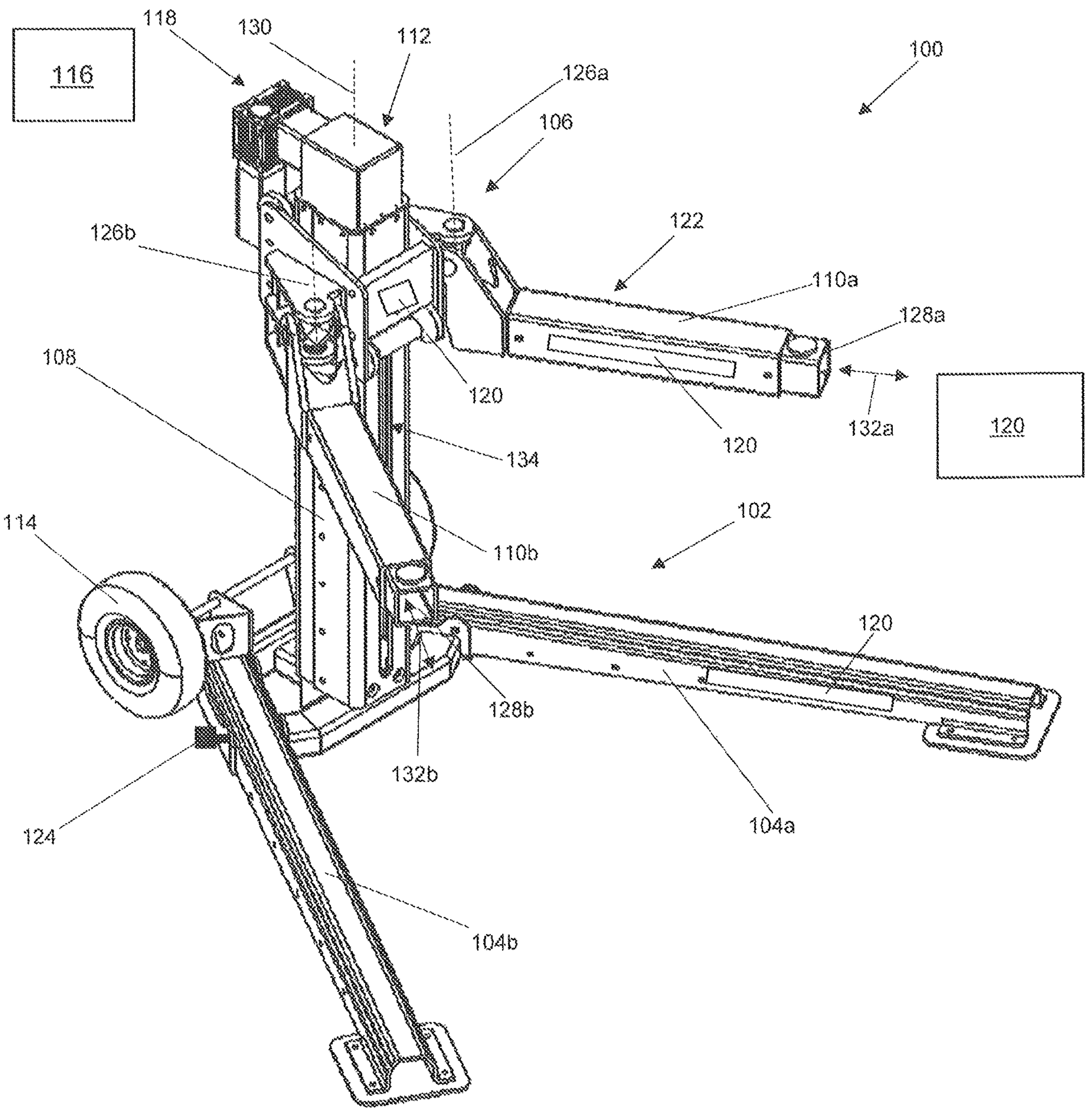
FIG. 1*a* is an elevated perspective view of a lift assembly in the deployed configuration.
Figure 1B:
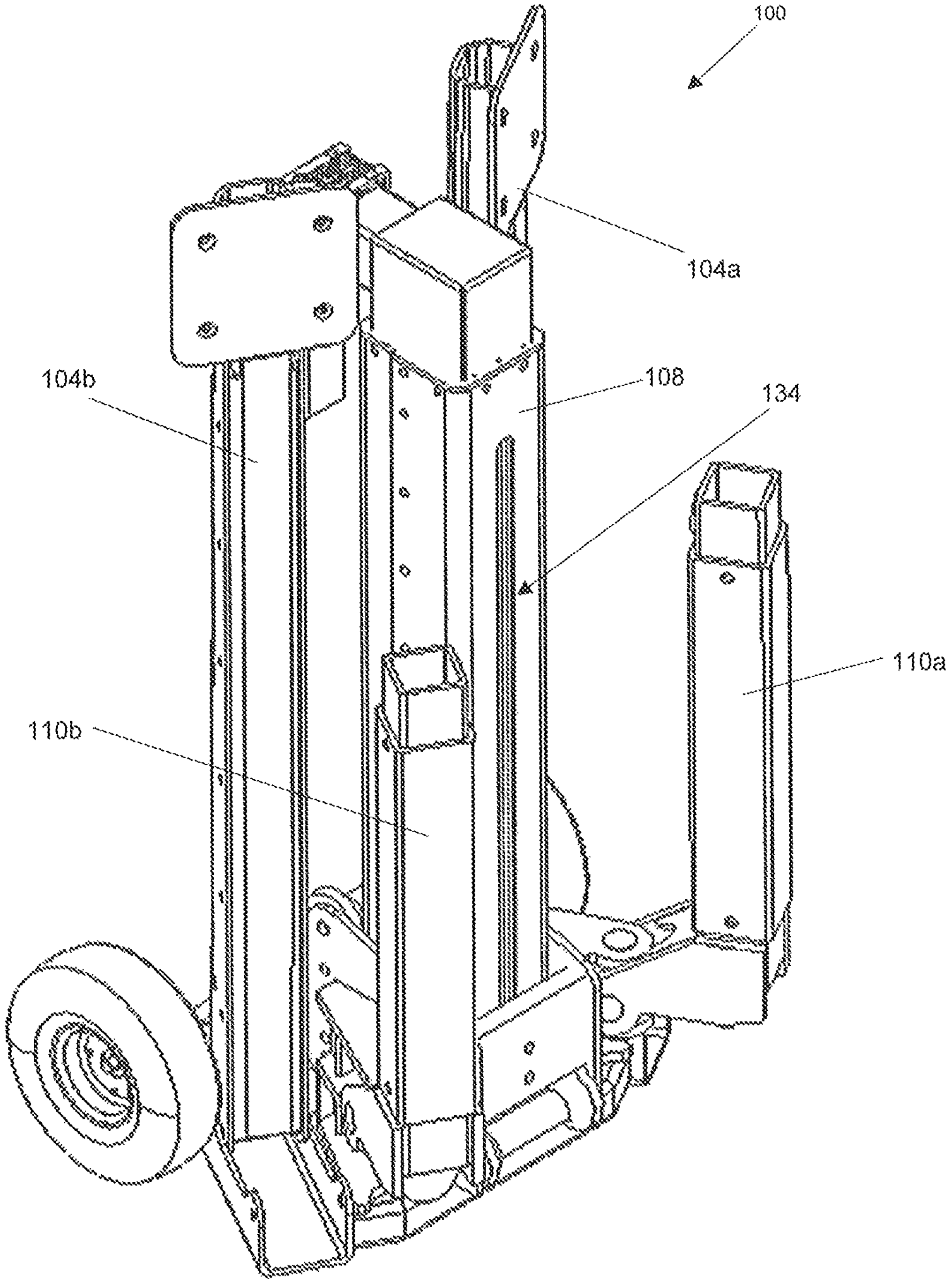
FIG. 1*b* is an elevated perspective view of the lift assembly of FIG. 1*a* in the folded configuration.
Figure 2:
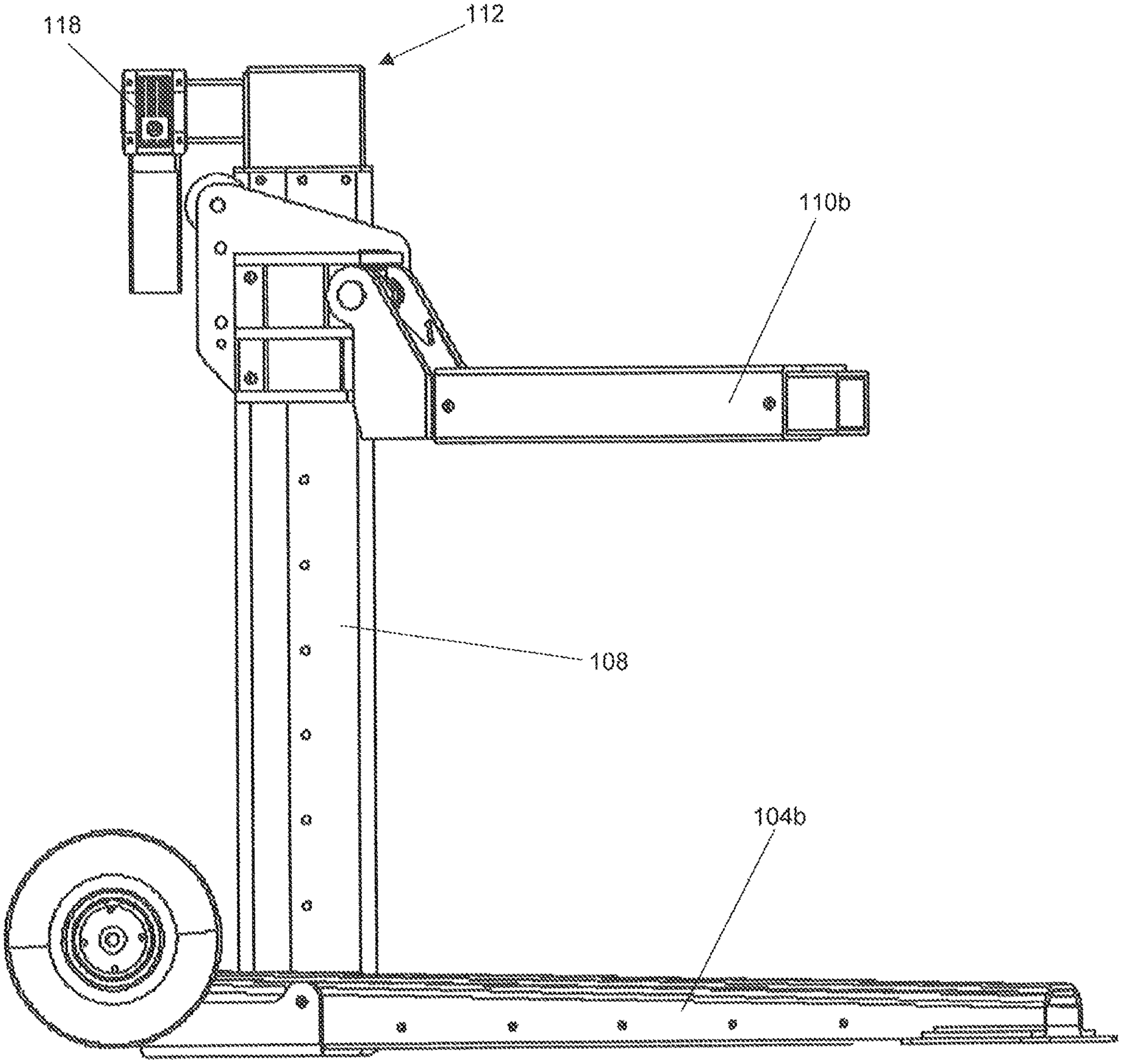
FIG. 2 is a side view of the lift assembly of FIG. 1*a;*
Figure 3:
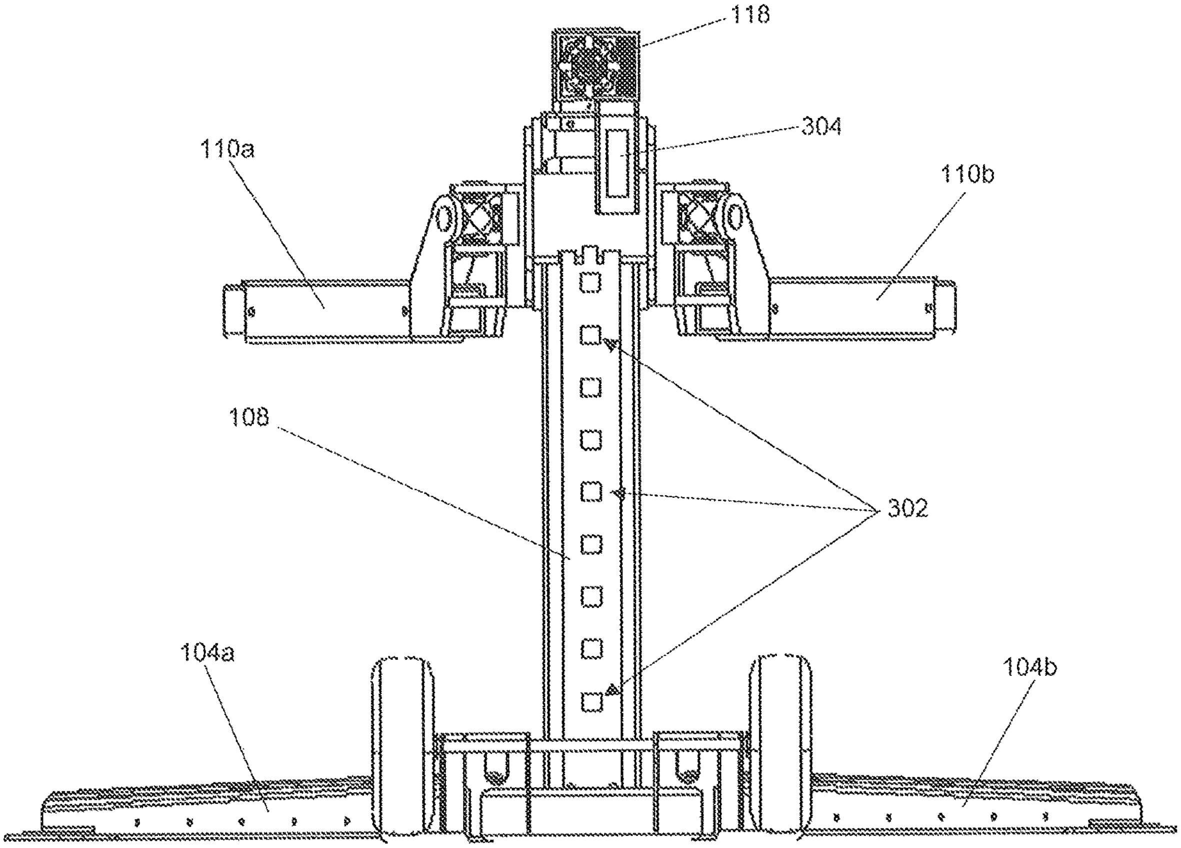
FIG. 3 is a back view of the lift assembly of FIG. 1*a;*
Figure 4:
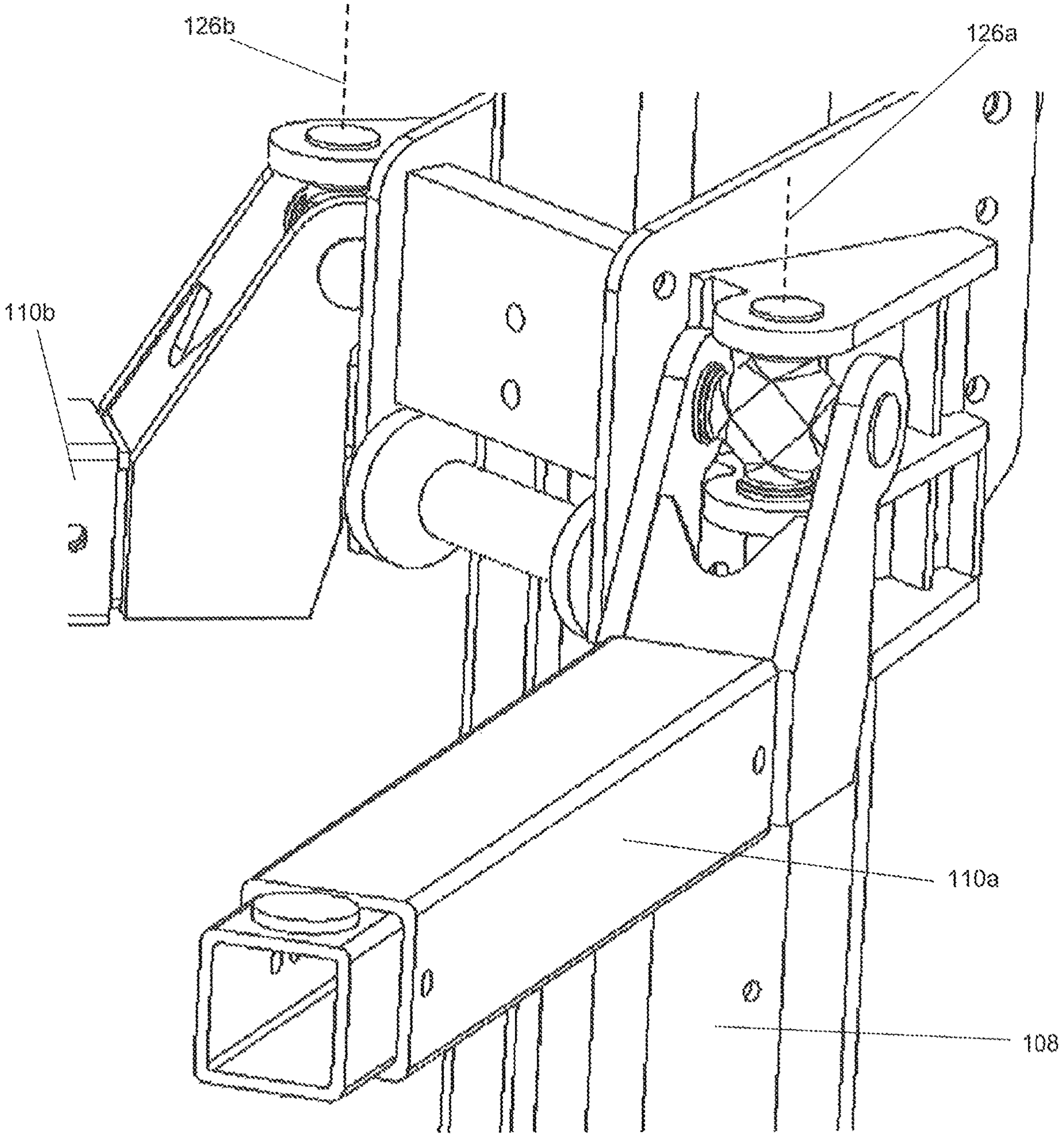
FIG. 4 is a partial detailed view of a carriage.
Figure 5:
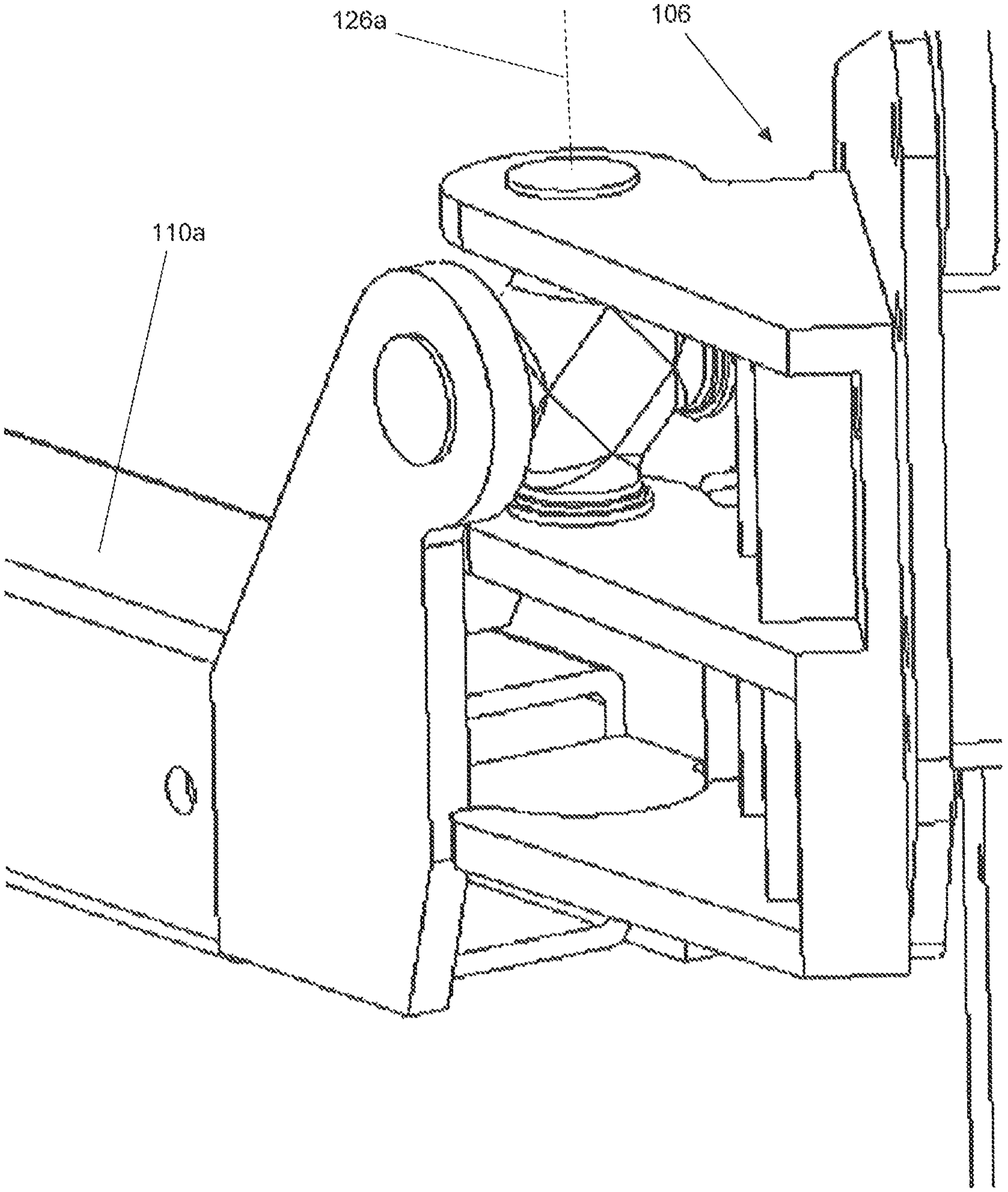
FIG. 5 is another partial detailed view of a portion of the carriage of FIG. 4.
Figure 6:
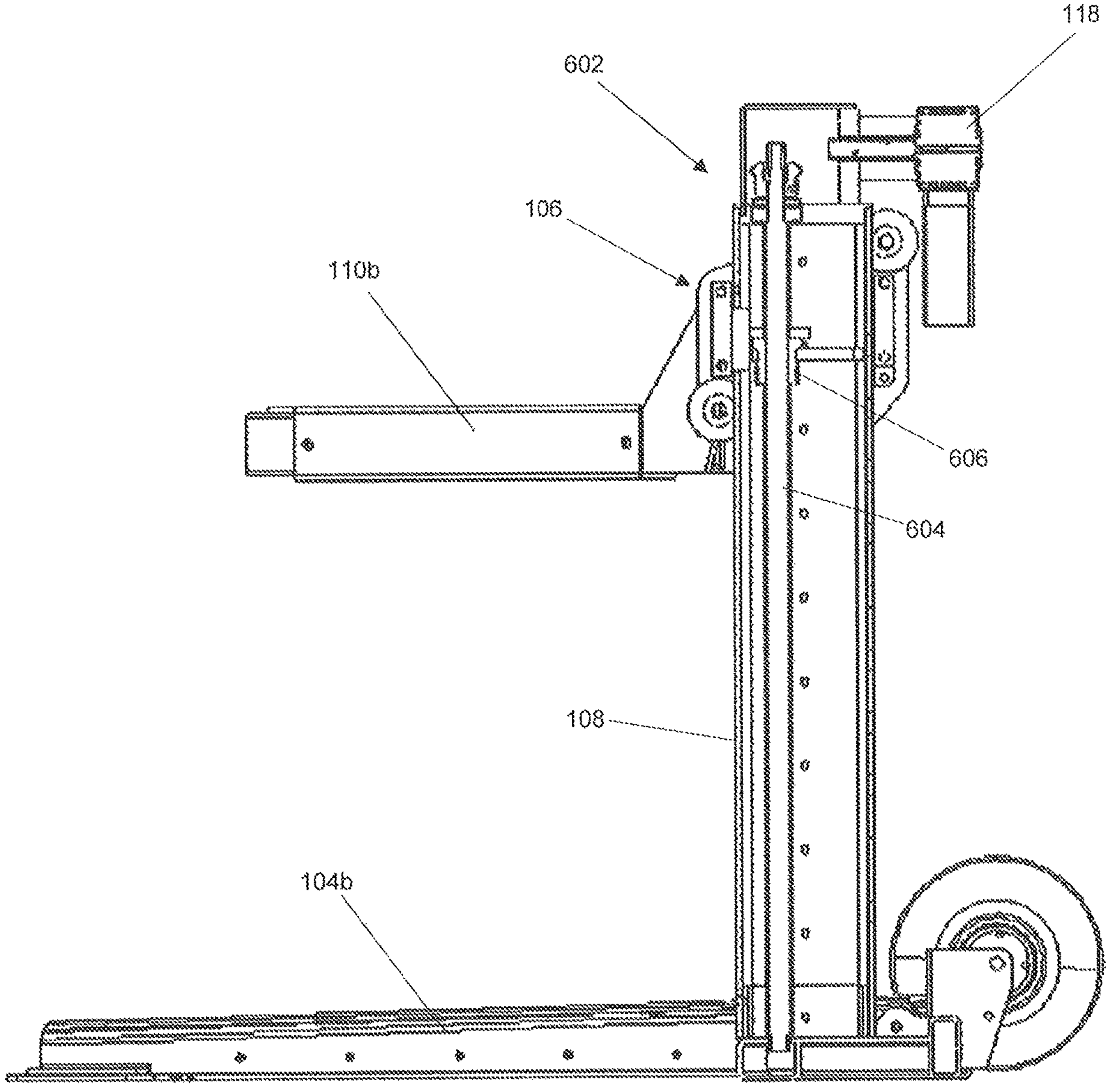
FIG. 6 is a section side view of the lift assembly of FIG. 1*a;*
Figure 7:
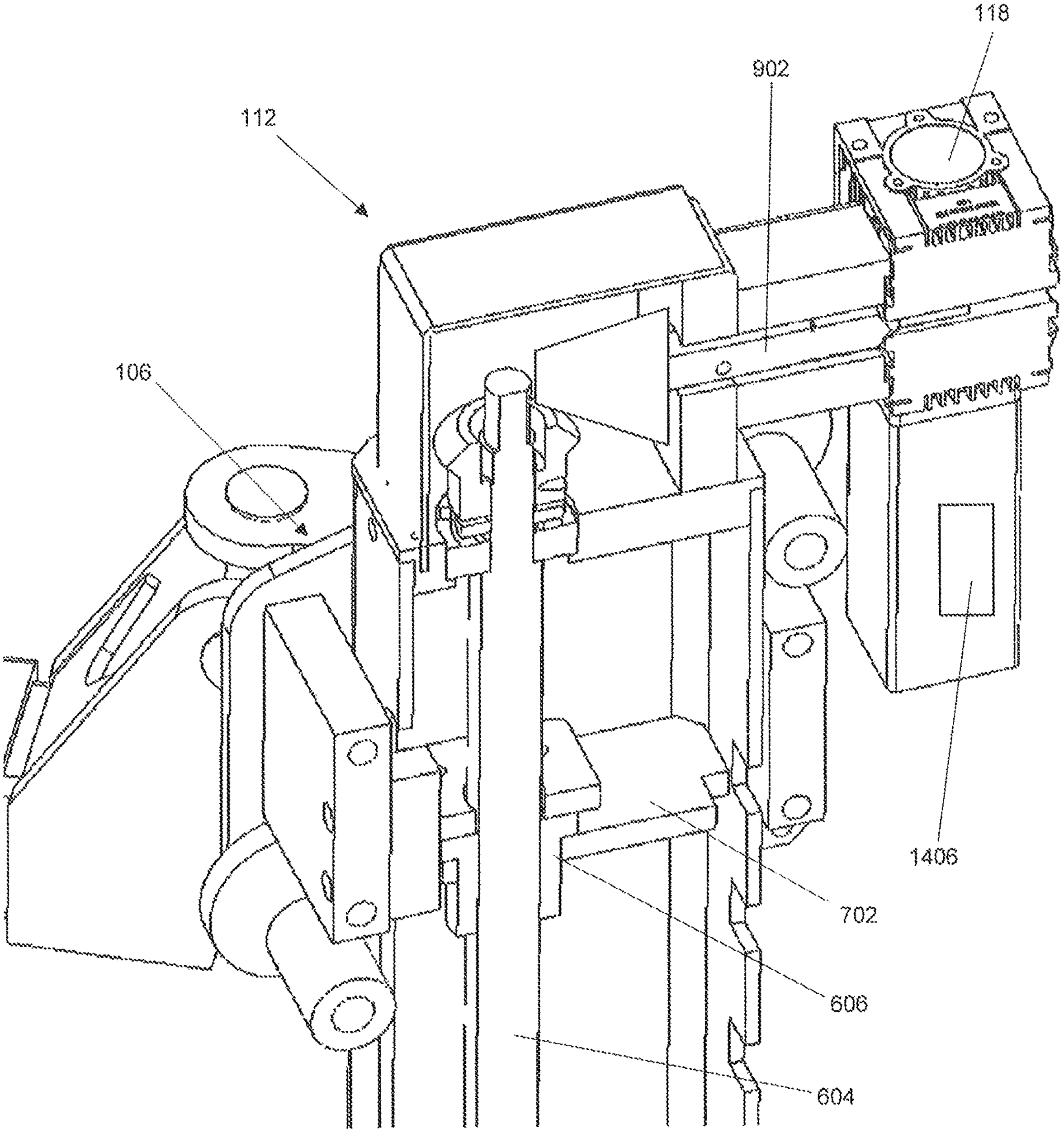
FIG. 7 is a detailed section view of a distal end of a mast of the lift assembly of FIG. 1*a;*
Figure 8:
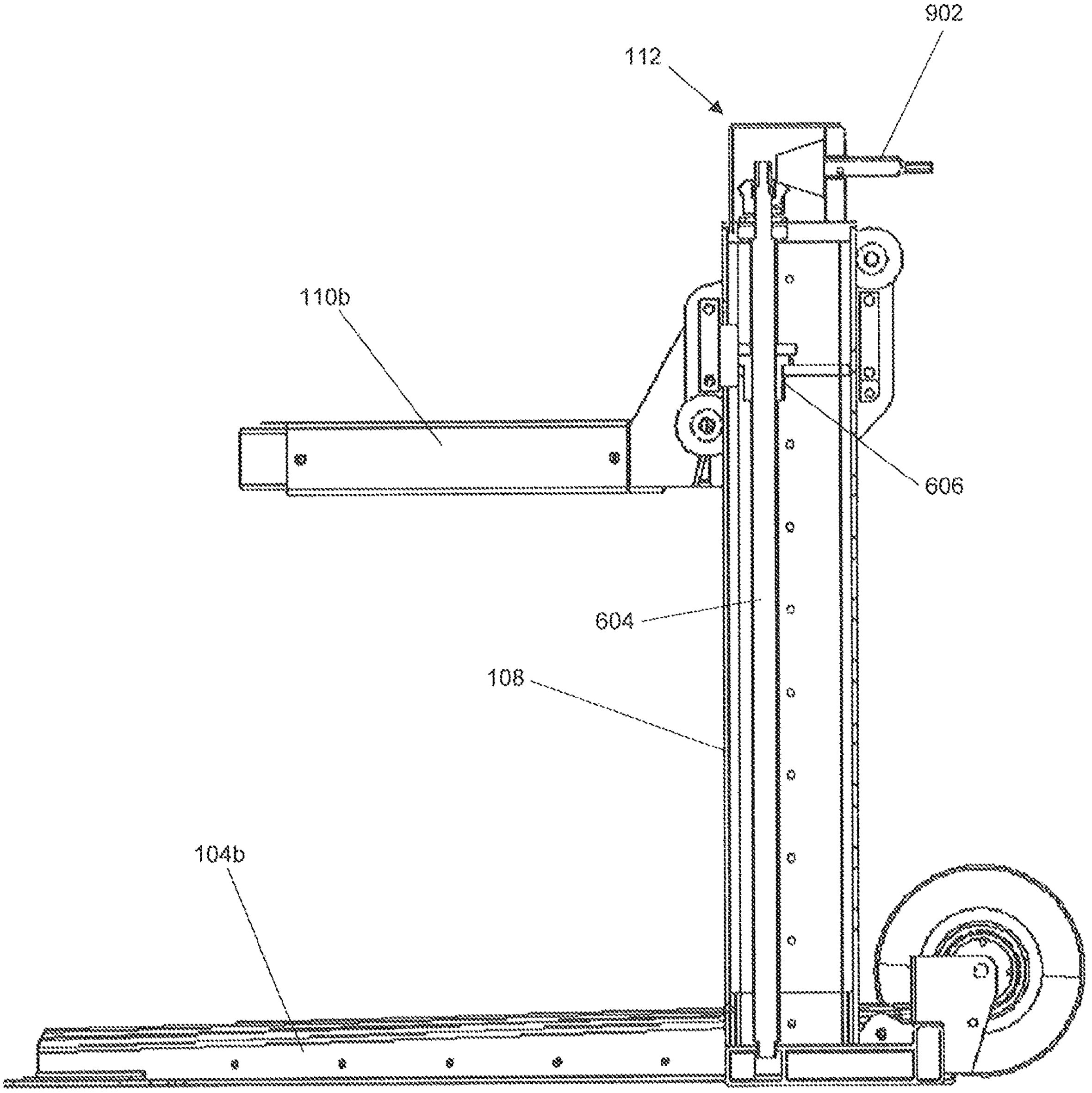
FIG. 8 is a section side view of the lift assembly of FIG. 1*a* with a power unit removed.
Figure 9:
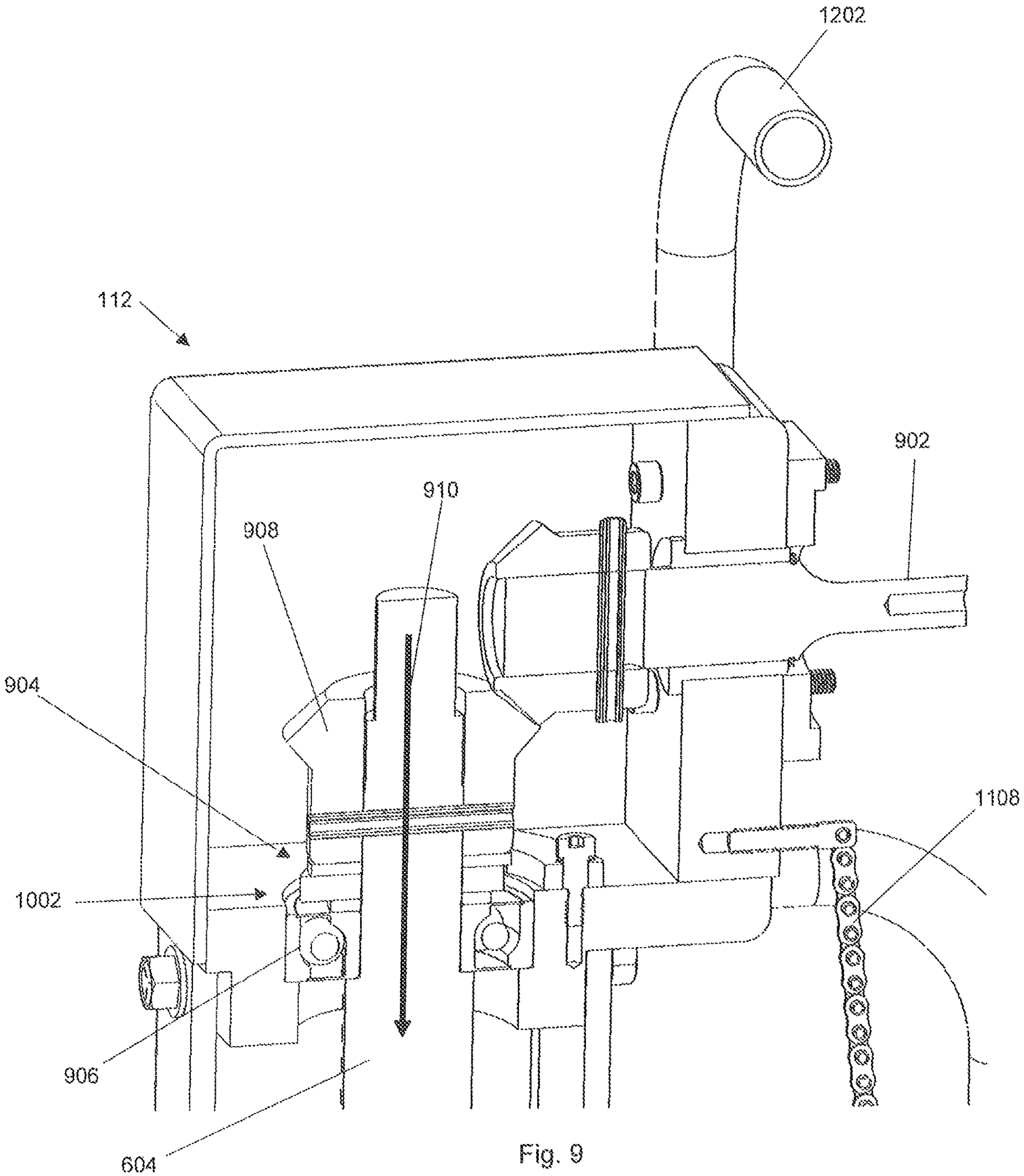
FIG. 9 is another detailed section view of a distal end of a mast of the lift assembly of FIG. 1*a;*
Figure 10:
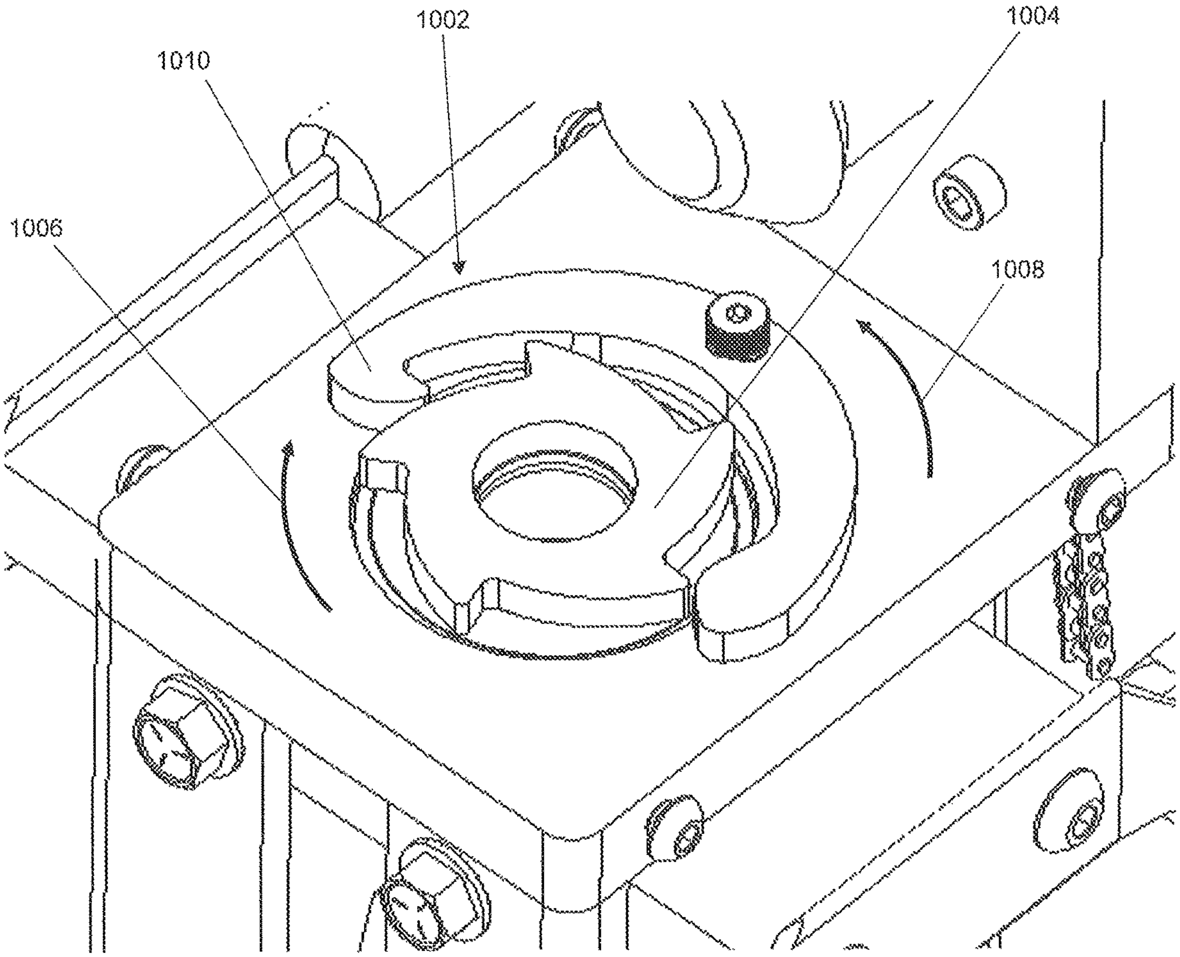
FIG. 10 is a detailed partial section view of an anti-reversing mechanism of the lift assembly of FIG. 1*a;*

The embodiments of the present disclosure described below are not exhaustive and do not limit the disclosure to the precise forms in the following detailed description. Rather, the embodiments are chosen and described so that others skilled in the art may appreciate and understand the principles and practices of the present disclosure.

The present disclosure includes a lift assembly 100 comprised of a base 102 with pivoting support legs 104*a*, 104*b*, a primary lifting ball screw and nut assembly 602, a guided carriage 106 that attaches to a ball screw 604, a vertical mast section 108 that substantially encompasses the ball screw 604 and provides support for the guided carriage 106, a lifting member 122 that includes lift arms 110*a*, 110*b* which pivot vertically and horizontally, and extend telescopically, a right angle drive component 112, an anti-reversing locking mechanism 1002, a ratcheting locking mechanism 1102, at least one transport roller 114, a transport handle 1202, and LED lighting 120. The lift assembly 100 is powered either with a separate battery operated cordless drill 116 or an integrated cordless battery operated power unit or simply "power unit" 118.

One embodiment includes optional base leg and lift arm extension attachments that are available that allow the lift assembly 100 to lift from the side of the vehicle, the front of the vehicle or the rear of the vehicle. Two lift assemblies 100 can be used in conjunction with one another to lift a vehicle completely off the ground.

The power unit 118 can be wirelessly controlled through communication with a smart phone or any type of wireless remote control 120. For example, a user may download an application to the smart phone or other remote device that utilizes known wireless protocols to communicate with the power unit 118 to selectively raise and lower the guided carriage 106 based on commands sent form the smart phone or other device.

The lift assembly 100 is substantially free of hoses, wires or external connections, and may obtain its power from the rechargeable, battery operated, power units 118. The power unit 118 has the capability to be operated directly through a user interface 304 positioned on the lift assembly 100. The user interface 304 may be a push button, a membrane switch, touch-screen or any other known user input positioned on the power unit 118 or other portion of the lift assembly 100. The user interface 304 may be used instead of the smart phone or other wireless remote control module 120. In one example, instructions from the user interface 304 may be given priority over instructions from the smart phone or other wireless remote control 120. For example, if a wireless command from the smart phone is sent to the power unit 118 to raise the lift member 122 but the power unit 118 also received an input from the user interface 304 to lower the lift member 122, the power unit 118 will execute the command from the user interface 304 and ignore the wireless command.

The lift assembly 100 is light weight and easily portable, yet has the capability of lifting vehicles of varying weights. The lift assembly 100 has redundant safety locking mechanisms 1002, 1102 to insure the lift assembly 100 cannot lower unintentionally when work is being performed on the vehicle. Base leg and lift arm extensions can be added to allow for various configurations of vehicles to be lifted from the front, rear, or sides. One of the other features of the lift assembly 100 is that the base leg extensions may have removable drive over ramps 1302 to allow the vehicle to drive over them when leaving or entering the pit area or the like. In this configuration, the lift assembly 100 does not have to be physically moved out of the way when lifting from the sides of the vehicle, the vehicle may simply drive over the base leg extensions to be positioned next to the lift assembly 100 for use.

In use, the lift assembly 100 is manually rolled into position via one or more transport roller 114 that rolls easily over uneven surfaces such as sand and gravel. An ergonomically located transport handle 1202 makes it easy for the operator to maneuver the lift assembly 100. Once the lift assembly 100 is near the lift position, the operator pivots the support legs 104*a*, 104*b* and lift arms 110*a*, 110*b* down and locks the support legs 104*a*, 104*b* into place with locking pins 124. Depending on the lift assembly 100 requirement, the optional base leg and lift arm extensions can be inserted and axially moved telescopically into proper position. For example, each lifting arm 110*a*, 110*b* can pivot about a corresponding axis 126*a*, 126*b* that is about parallel with a mast axis 130. This configuration allows the lift arms 110*a*, 110*b* to be pivoted about their corresponding axes 126*a*, 126*b* relative to the guided carriage 106 to be positioned at a desirable location on the vehicle. Further, the lift arms 110*a*, 110*b* may have a telescoping section 128*a*, 128*b* that is moveable in a telescoping directions 132*a*, 132*b* relative to the corresponding lift arm 110*a*, 110*b* to be positioned underneath an ideal section of the vehicle such as the frame.

When the lift assembly 100 is in its ideal lifting position underneath a section of the vehicle, the operator may use a rechargeable cordless drill 116 or power unit 118 to engage the right angle drive component 112 and ball screw 604 to begin lifting the vehicle. While a right angle drive component 112 is discussed herein, one embodiment may utilize a drive component that is not at a right angle relative to the ball screw. Accordingly, other angular orientations of the drive component 112 relative to the ball screw 604 are contemplated by this disclosure.

The ball screw 604 drives a ball bearing nut 606 that is attached to the lift guided carriage 106 which holds the lift arms 110*a*, 110*b*. The ball screw and nut assembly 602 may be configured so the ball screw 604 is selectively rotatable via the input shaft 902. Further, the ball bearing nut 606 may be coupled to the guided carriage 106 through an internal plate 702. The internal plate 702 may be sized to move axially along the mast axis 130 as the ball screw 604 rotates. More specifically, as the ball screw 604 rotates, the ball bearing nut 606 remains relatively stationary and is prevented from rotating with the ball screw 604 in part because the ball bearing nut 606 is coupled to the internal plate 702 and prevented from rotating substantially within the mast 108 cavity. The internal plate 702 may be coupled a portion of the guided carriage 106 located around the external periphery of the mast 108 through a longitudinal slot 134. In this configuration, as the ball bearing nut 606 moves axially along the ball screw 604, the guided carriage 106 is moved axially along the mast 108 as well.

The ball bearing nut 606 may have a plurality of ball bearings therein that are positioned between channels of the ball bearing nut 606 and corresponding channels of the ball screw 604. As the ball screw 604 rotates, the ball bearings between the ball bearing nut 606 and ball screw 604 roll along the channels in a cyclic rotation so the relative rotation between the ball screw 604 and the ball bearing nut 606 causes axial displacement of the ball bearing nut 606 along the ball screw 604.

As the lift assembly 100 is raising, the ratcheting locking mechanism 1102 engages and disengages with corresponding locking holes 302 in the mast section 108 to insure the lift assembly 100 will not fall in the event of drive failure. More specifically, the locking mechanism has an angled catch 1104 that has a sloped surface oriented towards the leading side when the guided carriage 106 is being raised such that the angled catch 1104 is guided out of the locking holes 302 as the sloped surface contacts an edge of the corresponding locking hole 302 urging the angled catch 1104 out of the locking hole 302. However, when the carriage 106 is moving towards the base 102 the ratcheting locking mechanism 1102 urges the angled catch 1104 into any adjacent locking holes 302. Further, the angled catch 1104 may have a catch surface to selectively catch a portion of an adjacent locking hole 302 when the carriage 106 is moving towards the base 102. In this configuration, if the carriage 106 begins to move towards the base 102 the angled catch 1104 will fall at least partially into a corresponding locking hole 302 and the catch surface will engage the corresponding part of the mast 108 to prevent the carriage 106 from moving further down the mast 108 towards the base 102.

Figure 11A:
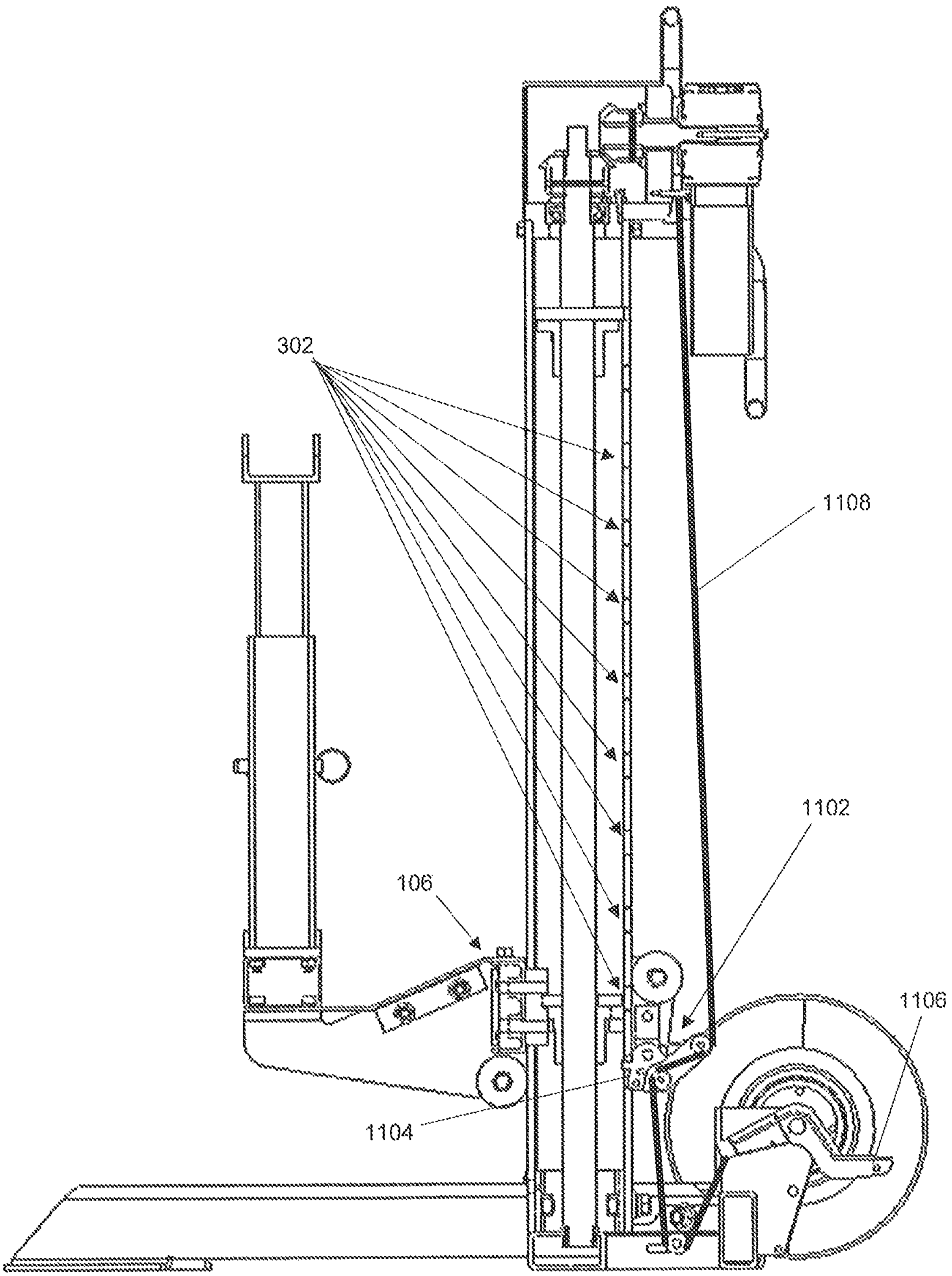
FIG. 11*a* is a section side view of a ratcheting release assembly of another embodiment of a lift assembly.
Figure 11B:
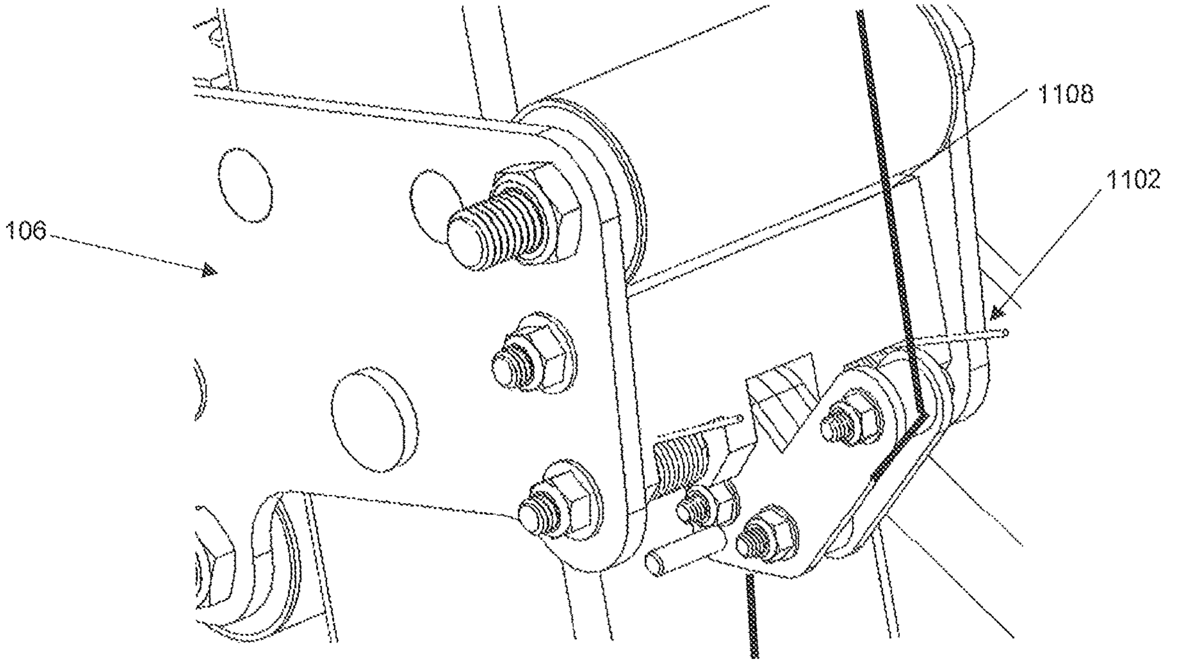
FIG. 11*b* is a detailed partial view of the ratcheting release assembly of FIG. 11*a;*
Figure 11C:
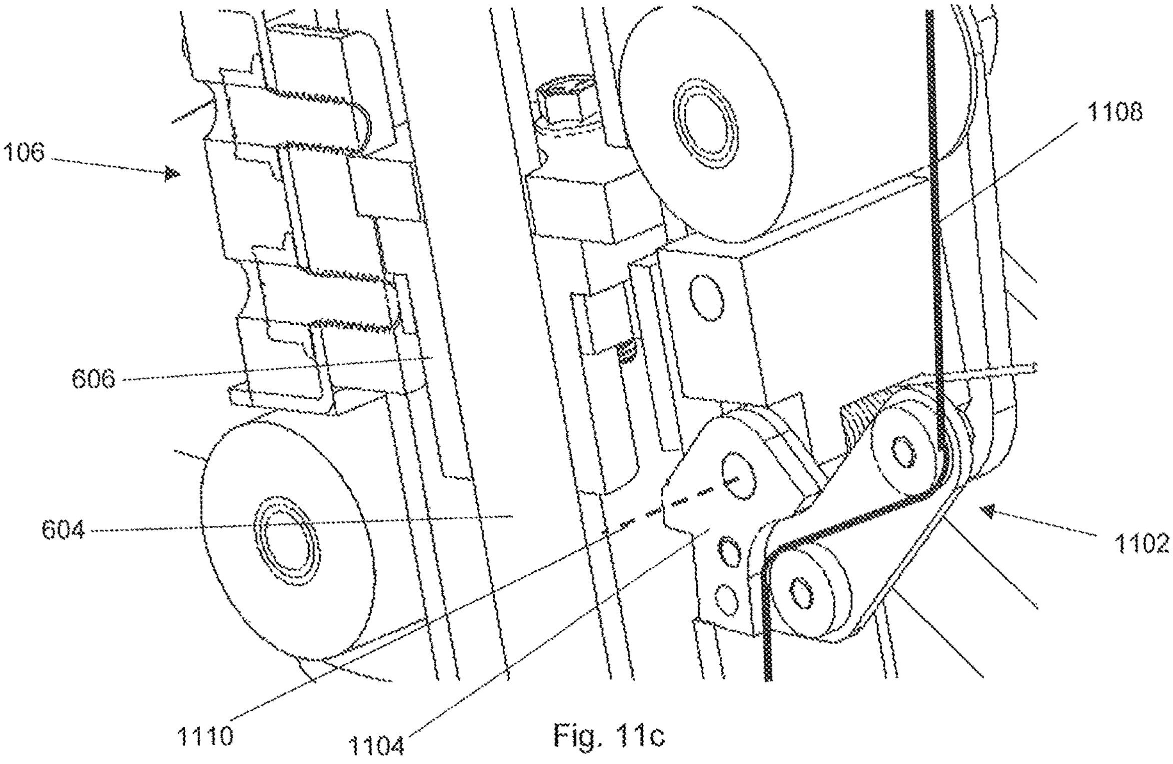
FIG. 11*c* is a detailed partial section view of the ratcheting release assembly of FIG. 11*a;*

To lower the carriage 106 towards the base, a release member 1106 may be engaged by the user while the ball screw 604 is being rotated in the lowering direction. The release member 1106 may be any engageable mechanism, but in the example of FIG. 11*a* the release member 1106 is a foot pedal to be engaged by a user's foot. The release member 1106 may pivot about an axis to apply tension to a corresponding line 1108. The line 1108 may be a wire, cable, rope, chain, or any other member able to maintain an adequate tension on the line 1108. Further, the line 1108 may run through a series of rollers from an end of the release member 1106 to a portion of the lift assembly 100 distal from the base 102. Rollers may be positioned along the ratcheting locking mechanism 1102 such that the carriage 106 may travel axially along the mast 108 without substantially affecting the tension on the line 1108. However, when the release member 1106 is pivoted by a user, the tension applied to the line 1108 may be such that the ratcheting locking mechanism 1102 is pivoted about a catch pivot 1110 so the angled catch 1104 will be pivoted away from the locking holes 302 as the carriage 106 is lowered towards the base 102. In other words, to lower the carriage 106 a user pivots the release member 1106 sufficiently to allow the angled catch 1104 to pass over the locking holes 302 without substantial contact, thereby allowing the guided carriage 106 to be lowered towards the base 102 when the ball screw 604 is rotated in the lowering direction.

In addition, the anti-reversing locking mechanism 1002 located at the top of the ball screw 604 will prevent the ball screw 604 from reversing once torque input through the input shaft 902 has been removed. More specifically, a rotary catch 1004 may be selectively rotationally coupled to the ball screw 604 via a clutch assembly 904. A lower side of the rotary catch 1004 may be positioned on a thrust bearing 906 while an upper surface of the rotary catch 1004 may selectively frictionally engage a surface of a gear 908 coupled to the ball screw 604. In this configuration, when a load 910 is applied to the ball screw 604 by lifting a vehicle or the like, the surface of the gear 908 adjacent the rotary catch 1004 is forced into the adjacent clutch assembly 904 and into the surface of the rotary catch 1004 thereby rotationally locking the rotary catch 1004 to the ball screw 604 via friction. As the ball screw 604 is rotated in the raising direction 1006 the rotary catch 1004 rotates with the ball screw 604 so teeth of the rotary catch 1004 sequentially pass a hook mechanism 1010 such that the rotary catch 1004 may rotate in the raising direction 1006 without being substantially restricted by the hook mechanism 1010 but the rotary catch 1004 is prevented from rotating in the lowering direction 1008 by the hook mechanism 1010. In this configuration, the ball screw 604 may easily rotate in the raising direction 1006 without substantial restriction by the rotary catch 1004 but is restricted from rotating in the lowering direction 1008 by the rotary catch 1004 in unless the friction force applied by the clutch assembly 904 is overcome to allow the ball screw 604 to rotate in the lowering direction 1008 while the rotary catch 1004 is prevented from such rotation through contact with the hook mechanism 1010.

The clutch assembly 904 is configured to apply a frictional force on the rotary catch 1004 to rotationally lock the rotary catch 1004 to the ball screw 604 when there is not an input provided through the input shaft 902. If the weight of the vehicle on the carriage 106 is applying a load 910 on the ball screw 604 that is translated via the ball bearing nut 606 to a torque to rotate the ball screw in the lowering direction 1008, the teeth of the rotary catch 1004 will contact the hook mechanism 1010 to prevent the ball screw 604 from rotating in the lowering direction 1008. The force applied by the vehicle on the carriage 106 may be insufficient to overcome the frictional coupling of the rotary catch 1004 to the ball screw 604 through the clutch assembly 904. However, when a torque is applied to the ball screw 604 through the input 902, the frictional coupling of the rotary catch 1004 to the ball screw 604 may be overcome such that the ball screw 604 slips relative to the rotary catch 1004 to allow the ball screw 604 to rotate in the lowering direction 1008 to lower the carriage 106. In other words, once a sufficient input torque is applied through the input shaft 902 the rotary catch 1004 remains locked to the hook mechanism 1010 but the ball screw 604 rotates relative to the rotary catch 1004 as the clutch assembly 904 is allowed to slip and the carriage 106 is lowered towards the base 102.

The clutch assembly 904 may utilize any known surface coating to achieve the desired slipping at the appropriate load conditions. As discussed herein, the clutch assembly 904 will have the appropriate frictional properties to keep the ball screw 604 coupled to the rotary catch 1004 and thereby prevent rotation in the lowering direction 1008 under expected load inputs from the carriage 106 along the ball screw 604. However, the frictional coating of the clutch assembly 904 may be such that expected input torques through the input shaft 902 can cause slipping along clutch assembly 904. The expected input torques can be based on those typically produced by a cordless drill or those produced by the power unit 118.

These redundant safety features allow for the operator to work safely under the vehicle. Once the lift assembly 100 is at the desired height, the operator can begin work on the car. After work is completed, the operator disengages the ratcheting locking mechanism 1102 and lowers the lift assembly 100 via the power unit 118 or other means for applying torque to the input 902. The lift assembly 100 can then be moved out of the way, or in the case of the side lift feature can be left in place, allowing the vehicle to easily drive over the and lift arm extensions. Once all lifting activities are completed, the pivoting support leg and lift arm extensions are rotated and pivoted to a vertical position and locked in place as illustrated in FIG. **1*b*. The lift assembly 100** is then manually moved and stored for transport.

The lift assembly 100 may be powered by the battery operated power unit 118 to raise and lower the guided carriage 106. Further, a smart phone 120 may communicate with the power unit 118 to selectively raise and lower the carriage 106 based on user inputs from the smart phone 120. In one embodiment considered herein, two or more battery powered lift assemblies 100 may be wirelessly controlled by a single smart phone 120 to provide a coordinated lift. More specifically, a lift assembly 100 may be positioned on either side of a vehicle and the smart phone 120 may be engaged to lift the entire vehicle. In one aspect of this disclosure, the remote control may be a smartphone or other device having an application that communicates with the power unit 118 to initiate commands to the lift assembly 100 such as raising the guided carriage 106, lowering the guided carriage 10,6 or controlling or identifying any other aspect of the lift assembly 100.

Figure 14:
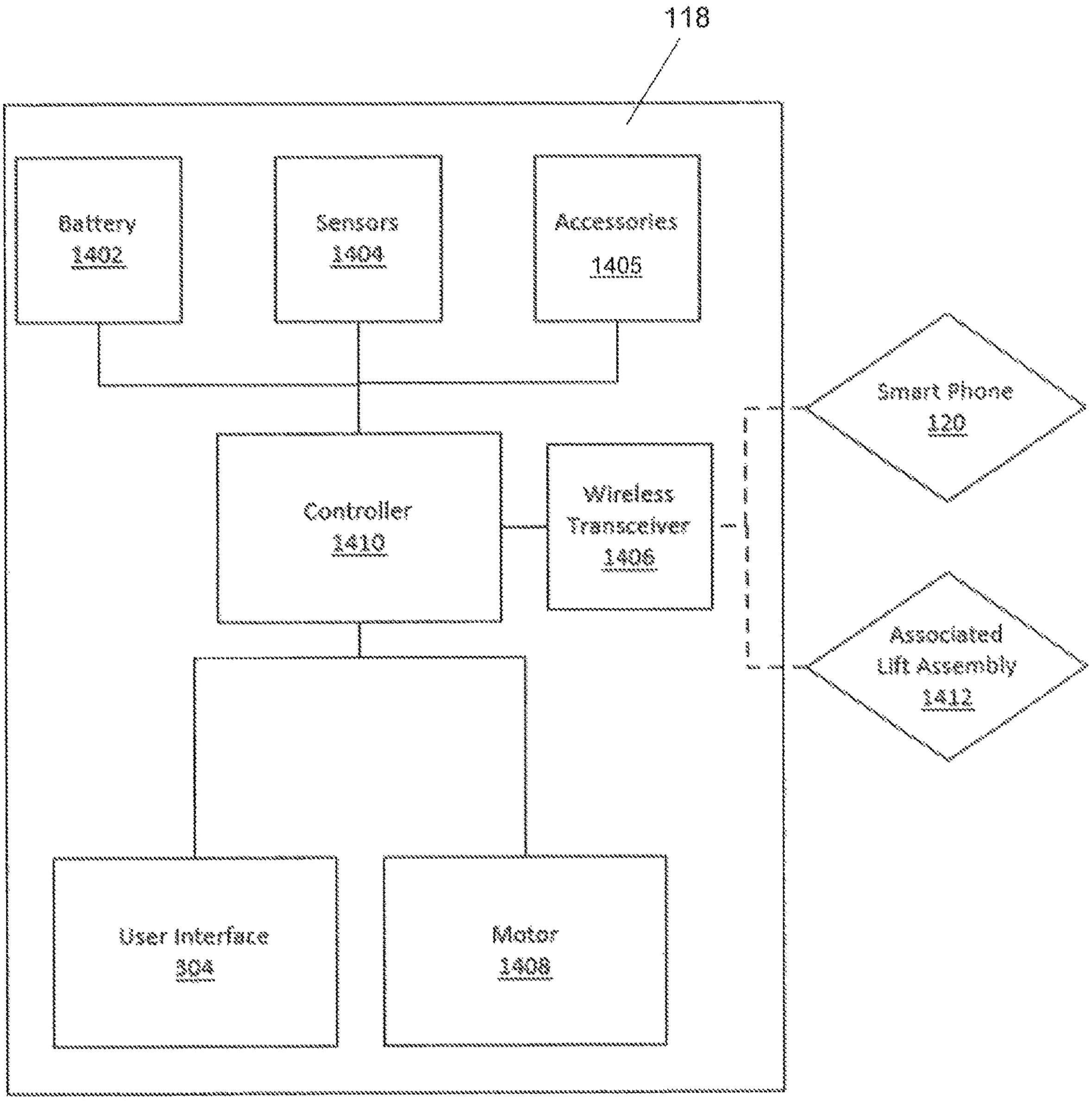
FIG. 14 is a schematic view of a power unit and communication devices for a lift assembly.

Referring to FIG. 14, a schematic representation of the power unit 118 and associated devices is illustrated. As shown in FIG. 14, the power unit 118 may have a battery 1402 to allow the lift assembly 100 to be used remotely and independent from a local power grid or pneumatic or hydraulic power. The battery 1402 allows the lift assembly 100 to be portable while still functioning as described herein. The power unit 118 may also have a plurality of sensors 1404 that identify the working conditions of the power unit 118. The sensors 1404 may include position sensors that identify the position of a motor 1408 to determine the location of the carriage 106, sensors monitoring the electrical components of the power unit 118, load sensors identifying the load on the lifting member 122, and any other sensor that can identify the state of the power unit 118 and lift assembly 100. The power unit 118 may also have an accessories output 1405 wherein the power unit can control accessories of the lift assembly such as the lights 120.

The power unit 118 may also have a wireless transceiver 1406 therein. The wireless transceiver 1406 may provide one or more wireless communication protocols for the power unit 118. For example, the wireless transceiver 1406 may communicate with an external device such as a smart phone 120 or another power unit 118 from an associated lift assembly 1412 through Bluetooth Low Energy ("BLE"), Wi-Fi (for example IEEE 802.11), or through any other known wireless communication protocol. The power unit 118 may also have a motor 1408 therein sized to have sufficient power to selectively move the ball screw 604 in either the raising direction 1006 or the lowering direction 1008.

A controller 1410 may be positioned in the power unit 118 to communicate with and control the power unit 118. The controller 1410 may identify user inputs from the smart phone 120 via the wireless transceiver 1406 or directly from the user interface 304. The controller 1410 may then selectively power the motor 1408 responsive to the user inputs to control the lift assembly 100 as desired by the user. The controller 1410 may also present information about the power unit 118 to the user or other device. For example, the controller 1410 may monitor one or more sensor 1404 to determine the location of the carriage 106 on the mast 108. Further, the controller 1410 may monitor the battery 1402 to determine the remaining battery power, which can be communicated to the user via lights, icons, beeps, or the like through the user interface 304 or presented to the user wirelessly on the smartphone 120.

The power unit 118 is removably coupled to the right angle drive component 112 so the motor 1408 can selectively rotate the input shaft 902. However, the power unit 118 may be removed from the right angle drive component 112 via known couplers to expose the input shaft 902 to be manipulated by other means such as a cordless drill or manual crank. The input shaft 902 may have a known pattern to provide for easy rotational coupling to the power unit 118 or cordless drill, manual crank, or the like. For example, the cross-section of a portion of the input shaft 902 may be hexagonal. However, other known shapes and coupling configurations are also contemplated herein.

As mentioned herein, in one embodiment of this disclosure an associated lift assembly 1412 can be linked to a primary lift assembly 100 to provide coordinated movement. For example, power unit 118 of the primary lift assembly 100 may communicate with the associated lift assembly 1412 when the user executes a raise instruction from the user interface 304 or the smart phone 120. The raise instruction will be identified by the primary power unit 118 and communicated to the associated lift assembly 1412. Alternatively, the smart phone 120 or other remote device may simultaneously send a raise instruction to both the primary lift assembly 100 and the associated lift assembly 1412. Regardless, the power units 118 of the corresponding lift assemblies 100, 1412 may each initiate a synchronized raise command wherein the power units 118 utilize the sensors 1404 to determine the position and other conditions of the corresponding lift assembly 100, 1412. In this way, two or more lift assemblies can coordinate a synchronized lift of a vehicle.

Figure 15A:
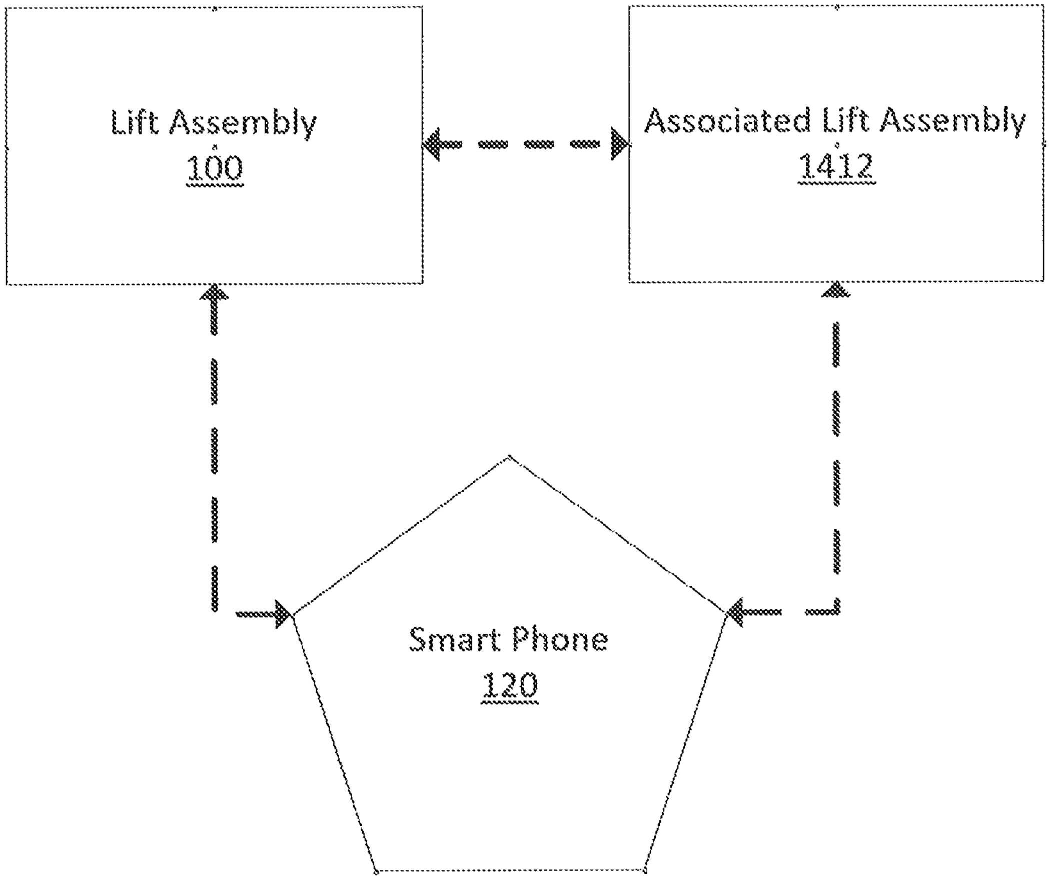
FIG. 15*a* is a schematic representation of a wireless communication protocol for a lift assembly.
Figure 15B:
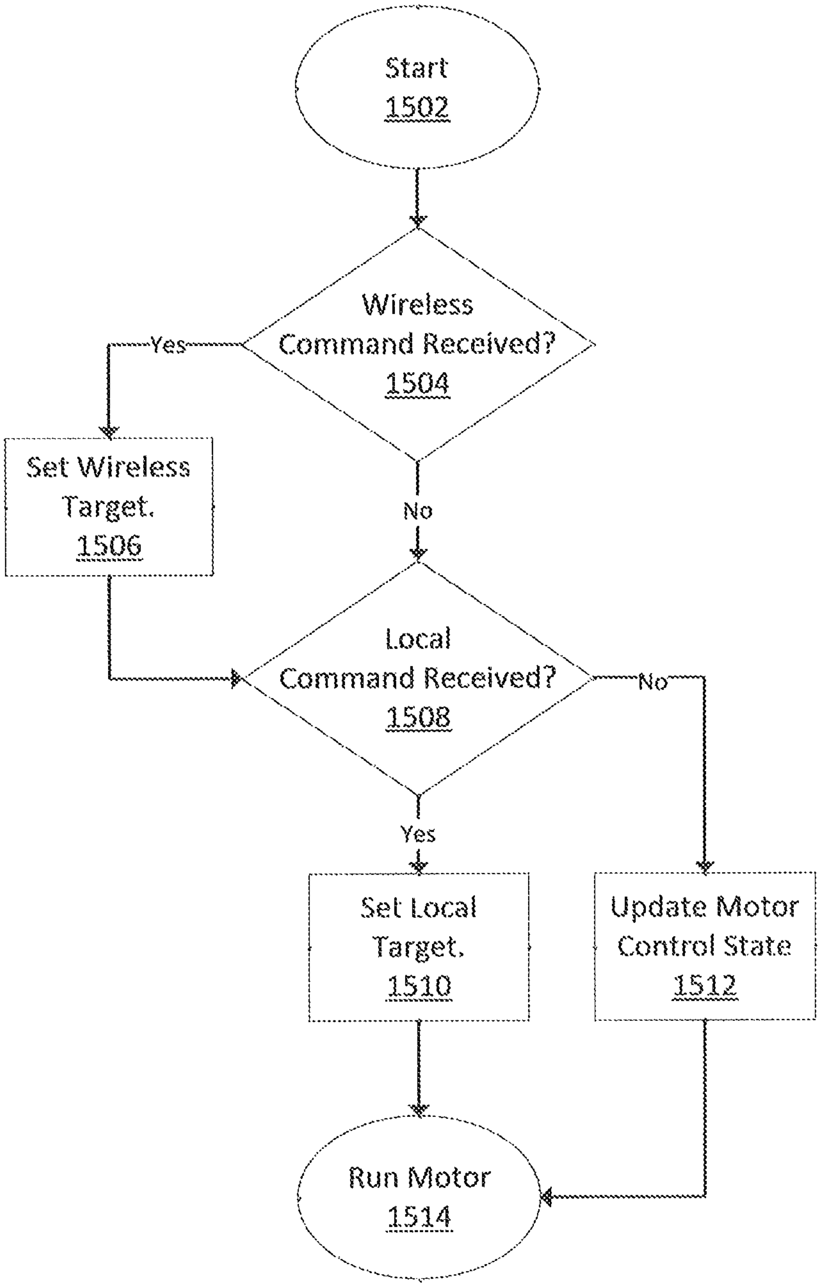
FIG. 15*b* is a logic flowchart for a power unit for a lift assembly.

Referring to FIGS. 15*a* and 15*b*, a schematic representation of a wireless logic flow and communication protocol is illustrated. For example, the smart phone 120 may communicate with one or both of the lift assembly 100 and the associated lift assembly 1412. In one aspect of this disclosure, the smart phone 120 may provide a programming feature that allows the smart phone 120 to wirelessly communicate with one or more lift assembly 100. The smart phone app may also allow the user to sync the lift assembly 100 with the associated lift assembly 1412 such that lift and lowering procedures are known to require synchronization between the lift assemblies 100, 1412. The lift assembly 100 and associated lift assembly 1412 may also communicate wireless directly with one another to identify whether any lift commands have been received or initiated at the user interface 304.

FIG. 15*b* illustrates an exemplary logic flow for commanding a lift assembly 100. A start 1502 may be initiated by opening the app on the smartphone 120 or powering on the user interface 304. Then, the power unit 118 may identify whether a wireless command was received 1504. The wireless command 1504 may be a raise command, a lower command, or an accessory command. If a wireless command was received in box 1504, the wireless target will be set in 1506. The wireless target may be a target associated with the wireless command such as to lift the carriage 106, lower the carriage 106, or activate an accessory. Box 1508 may be executed either after the wireless target is set in box 1506 or directly after box 1504 if no wireless command was received. Regardless, in box 1508 the power unit may determine whether a local command was received from the user interface 304. The local command may be any of a raise command, a lower command, or an accessory command among others. Regardless, if a local command was received in box 1508 any wireless set targets from box 1506 may be overwritten to set a local target in box 1510 wherein the local command from the user interface supersedes any wireless commands from the smart phone 120. Alternatively, if no local commands are identified in box 1508 the power unit 118 may update the desired motor state to the state associated with the wireless target in box 1512. In box 1514, the motor may be engaged to execute the desired target, either established by the local command in box 1508 or the wireless command in box 1506 when no local command was received. Further, in box 1514 any accessory commands such as turning on lights 120 may be initiated as well.

Figure 12:
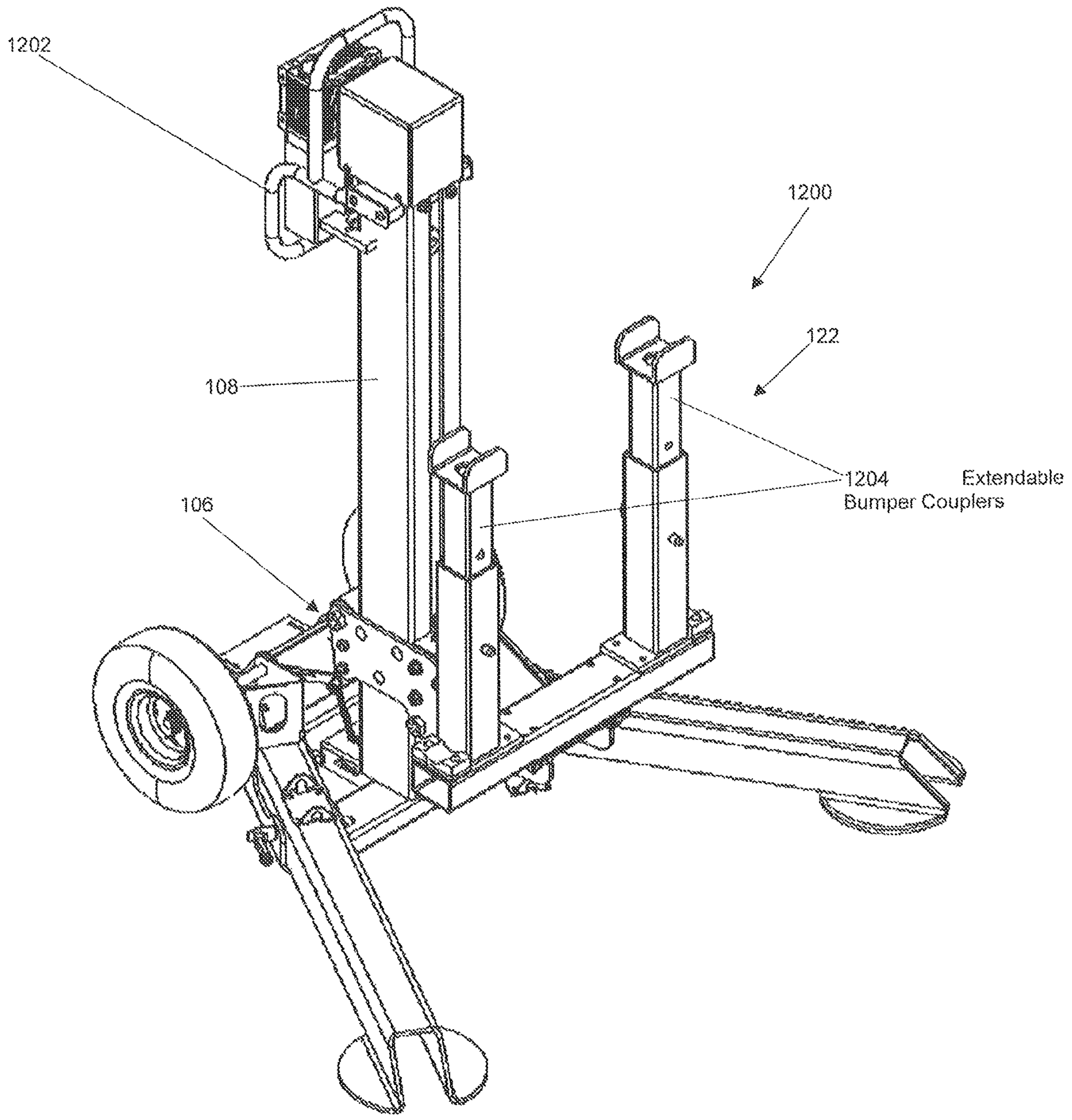
FIG. 12 is an elevated perspective view of another embodiment of a lift assembly.
Figure 13:
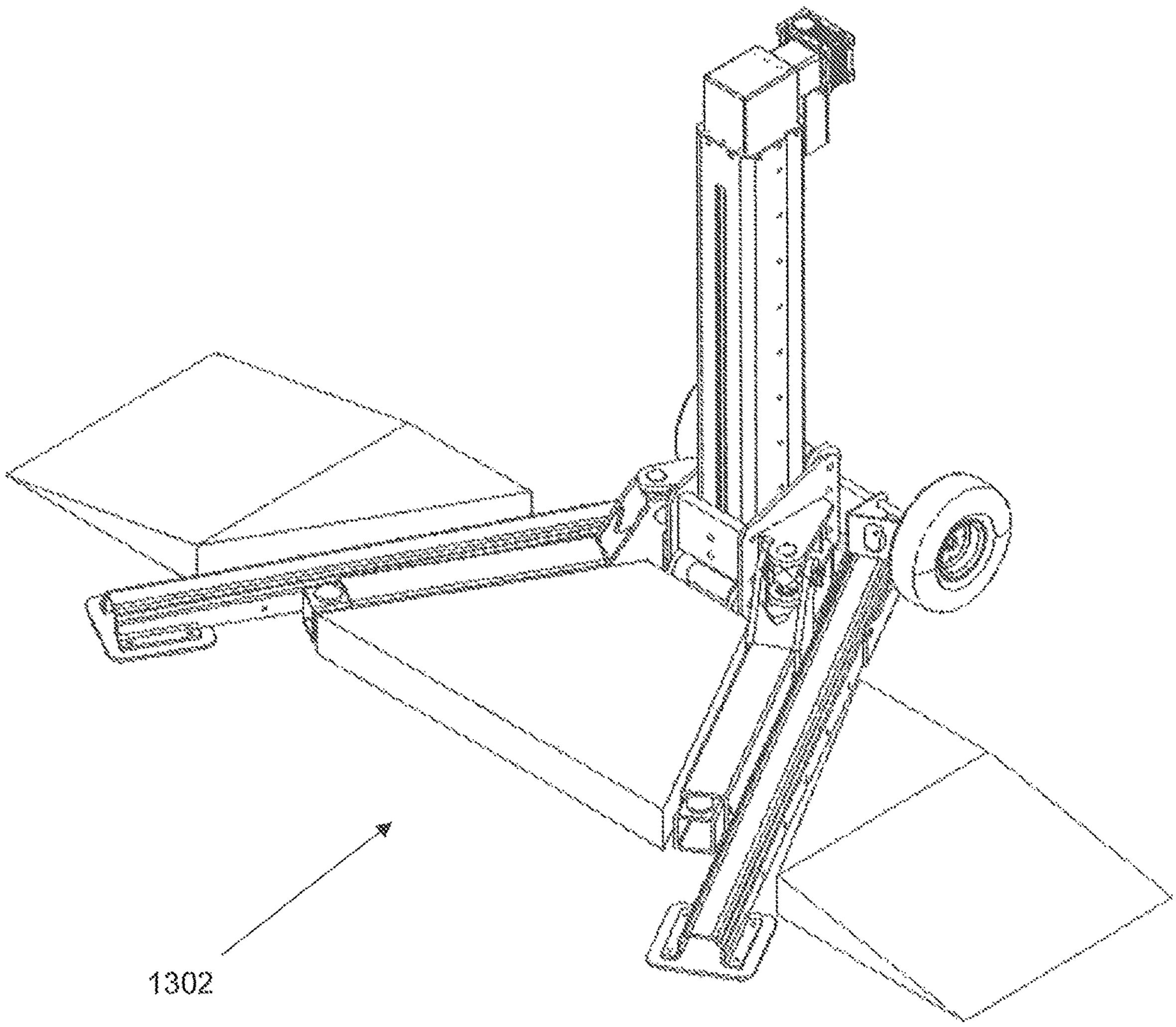
FIG. 13 is another embodiments of a lift assembly having drive-over ramps.

Yet another embodiment of a lift assembly 1200 is illustrated in FIG. 12. This lift assembly 1200 may be substantially the same as lift assembly 100 except the carriage 106 may have a lifting member 122 coupled to the carriage 106 that has a bumper lift configuration. More specifically, the lifting member 122 may have first and second extendable couplers 1204 that are adjustable to extend vertically relative to the carriage 106. This allows the extendable couplers 1204 to be extended to be just under the front or rear bumper of a vehicle while the lift assembly 1200 is in the lowered configuration. In this configuration, once the carriage starts moving to the raised position the bumper coupler 1204 may engage the vehicle and begin lifting the vehicle at the lower portion of the mast 108. This ensures the vehicle will be sufficiently lifted when the carriage reaches a distal portion of the mast 108 relative to the base 102 to allow a user to service the vehicle. In other words, the embodiment of FIG. 12 provides adjustable bumper couplers 1204 that allows the lift assembly 1200 to be utilized on vehicles having different bumper clearances from the underlying ground.

Figure 16:
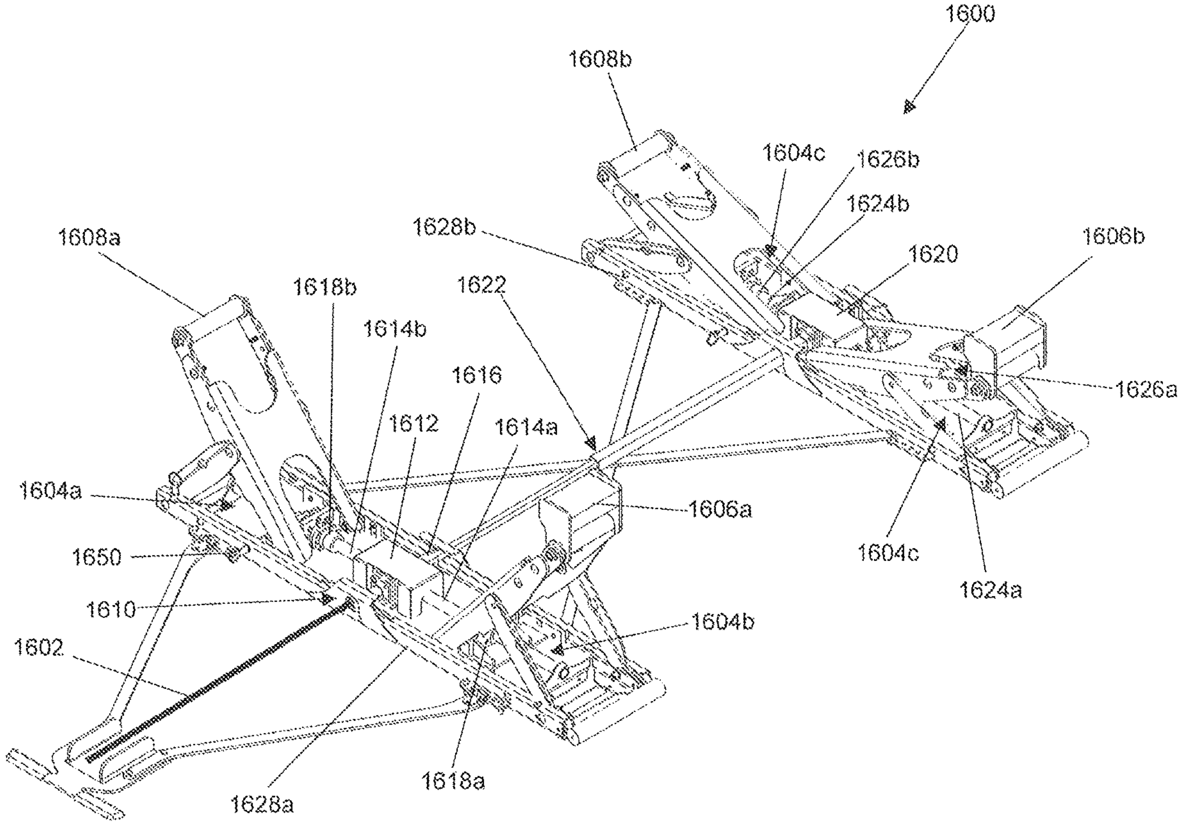
FIG. 16 is an elevated perspective view of a full vehicle lift assembly.

Referring now to FIG. 16, a full vehicle lift 1600 embodiment is illustrated wherein a single input drive shaft 1602 operably controls a plurality of screw assemblies 1604*a*, 1604*b*, 1604*c*, 1604*d* (collectively "1604") to selectively raise and lower corresponding support pads 1606*a*, 1606*b* and rollers 1608*a*, 1608*b*. More specifically, the input drive shaft 1602 may have a universal joint 1610 before entering a first gear box 1612. The universal joint 1610 may allow the input drive 1602 shaft to become linearly offset from a rotation axis of the first gear box and still allow rotation of the input drive shaft 1602 to be properly directed towards the rotation axis of the gear box. In one aspect of this disclosure, the input shaft 1602 may be driven by a user via a cordless drill 116.

In another aspect of this disclosure contemplated herein the input drive shaft 1602 may be driven by a power unit 118 coupled to the drive shaft 1602. Alternatively, there may be no drive shaft 1602 at all and the power unit 118 may be coupled directly to the universal joint 1610 or otherwise to provide a mechanical input to the first gear box 1612. The power unit 118 may be substantially the same power unit 118 discussed herein and may be battery powered to selectively rotate the first gear box 1612. The power unit 118 may be engaged to rotate the first gear box 1612 in a raising direction or a lowering direction. As discussed herein, the power unit 118 may have inputs, such as buttons, on a user interface 304 that a user can manipulate to rotate the first gear box 1612 in the raising direction or the lowering direction. The power unit 118 may also communicate wirelessly with a remote control 120 to selectively rotate the input shaft in the raising or lowering direction based on inputs received wirelessly from the remote control 120. Accordingly, the power unit 118 of the full vehicle lift 1600 may have all of the features discussed herein for the power unit 118.

The first gear box 1612 may receive rotary input from the input shaft 1602 and provide three corresponding rotary outputs. A first and second rotary output of the first gear box 1612 may be directed to first and second ball screws 1614*a*, 1614*b* coaxially aligned on opposing sides of the first gear box 1612. The first and second ball screws 1614*a*, 1614*b* may be threadably engaged with corresponding first and second ball screw nuts 1618*a*, 1618*b* to raise and lower the lift assembly as discussed herein. The first gear box 1612 may have an auxiliary rotary output 1616 that provides a rotary input to a second gear box 1620 through a telescoping drive shaft 1622.

The second gear box 1620 may similarly have a third and fourth rotary output that correspond with third and fourth ball screws 1624$a$, 1624$b$ coaxially aligned on opposing sides of the second gear box 1620. The third and fourth ball screws 1624$a$, 1624$b$ may be threadably engaged with corresponding third and fourth ball screw nuts 1626$a$, 1626$b$ to raise and lower the lift assembly 1600 in unison with the first and second ball screws 1614$a$, 1614$b$ as discussed herein.

In this configuration, rotary input provided to the first gear box 1612 is directed through the first gear box 1612 to the first and second ball screws 1614$a$, 1614$b$ and out the auxiliary rotary output 1616. The auxiliary rotary output 1616 is coupled to the input of the second gear box 1620 through the telescoping drive shaft 1622 to thereby further rotate the third and fourth ball screws 1624$a$, 1624$b$ upon rotation of the telescoping drive shaft 1622. Each gear box 1612, 1620 may have substantially the same gear ratios wherein rotation of the input shaft causes each of the ball screw shafts 1614$a$, 1614$b$, 1624$a$, 1624$b$ to rotate at substantially the same rate.

Figure 17:
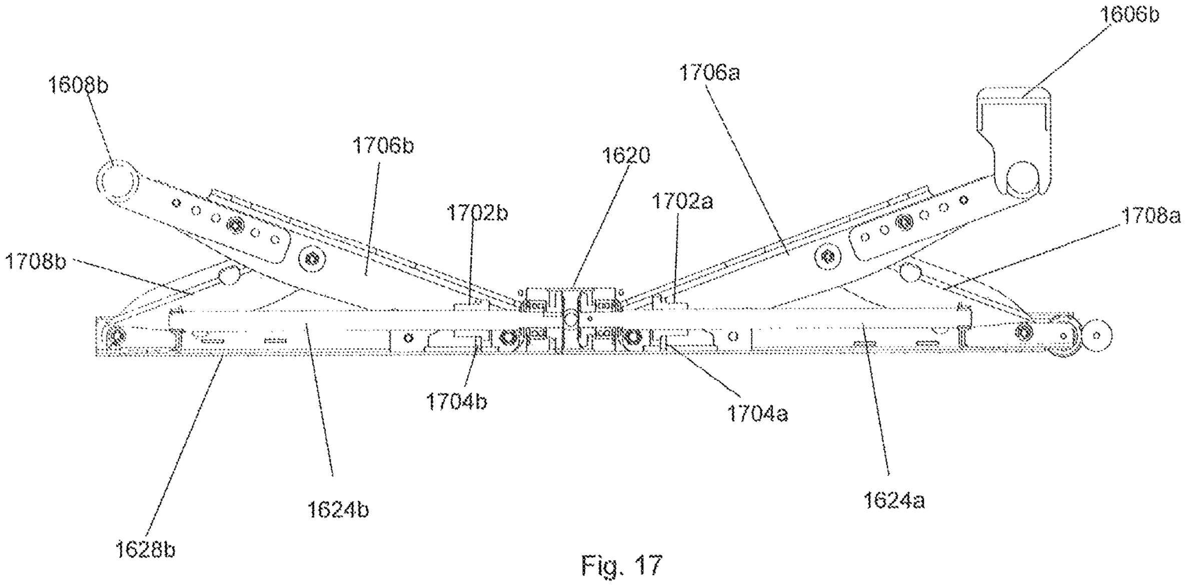
FIG. 17 is a section side view of the full vehicle lift assembly of FIG. 16.
Figure 18:
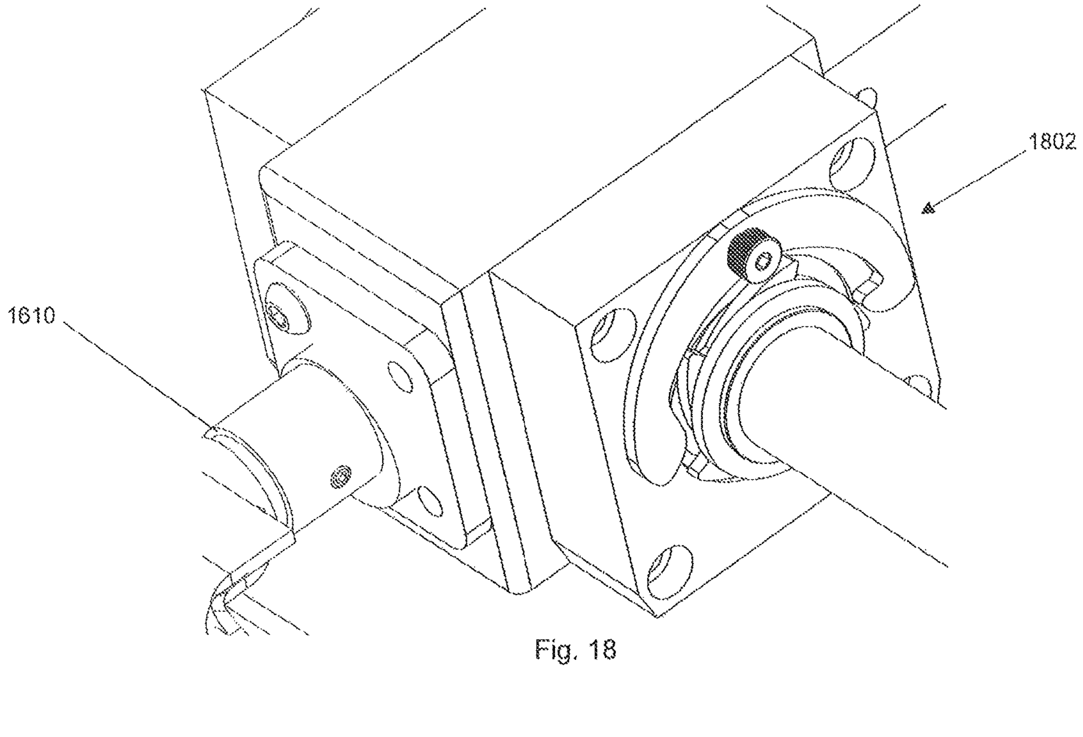
FIG. 18 is a partial detailed view of an anti-reversing mechanism for the full vehicle lift assembly of FIG. 16.

Referring now to FIG. 17, a sectional side view through the gear box 1620 is illustrated. The teachings with references to the components illustrated in FIG. 17 for gear box 1620 are substantially the same as those for the gear box 1612 and therefore the teachings with reference to FIG. 17 will not be repeated for gear box 1612 although they are equally applicable there as well. The ball screws 1624$a$, 1624$b$ may be coupled to a lift base 1628 such that the ball screws 1624$a$, 1624$b$ can rotate relative to the lift base 1628$b$ upon rotary input from the corresponding gear box 1620. Each lift screw 1624$a$, 1624$b$ has a lift nut 1702$a$, 1702$b$ coupled to a corresponding bracket 1704$a$, 1704$b$. The bracket 1704$a$, 1704$b$ is configured to slide within corresponding grooves of the lift base 1628$b$ to thereby allow the lift nut 1702$a$, 1702$b$ to move linearly along the lift base 1628$b$ upon rotation of the ball screw 1624$a$, 1624$b$ caused by rotary input from the gear box 1620. The bracket 1704$a$, 1704$b$ may also be coupled to a base portion of a first and second lift arm 1706$a$, 1706$b$. In this configuration, as the lift nut 1702$a$, 1702$b$ moves linearly along the lift base 1628$b$ due to rotary motion of the ball screw 1624$a$, 1624$b$, the base of the lift arm 1706$a$, 1706$b$ moves correspondingly therewith.

Each lift arm 1706$a$, 1706$b$ may also have at least one linkage 1708$a$, 1708$b$ pivotally coupled to a section of the lift arm 1706$a$, 1706$b$. The linkages 1708$a$, 1708$b$ may extend from the lift arm 1706$a$, 1706$b$ and be pivotally coupled to a distal portion of the lift base 1628 relative to the corresponding gear box 1620. In this configuration, as the lift nut 1702$a$, 1702$b$ moves the bracket 1704$a$, 1704$b$ and the base of the lift arm 1706$a$, 1706$b$ linearly along the lift base 1628$b$ away from the corresponding gear box 1620, the linkages 1708$a$, 1708$b$ cause the lift arm 1706$a$, 1706$b$ to pivot away from the lift base 1628$b$ to space a corresponding support pad 1606$b$ or support roller 1608$b$ farther from the lift base1628$b$.

In one aspect of this disclosure, each screw assembly 1604 may have an anti-reversing mechanism 1802 therein. The anti-reversing mechanism 1802 may substantially prevent the gear assembly 1612 from rotating in the lowering direction unless such a rotation is input through the universal joint 1610 or telescoping drive shaft 1622 of the gear boxes 1612, 1620. This anti-reversing mechanism 1802 may prevent the screw assemblies 1604 from unintentionally lowering due to pressure on the support pad and rollers. The anti-reversing mechanisms 1802 may be positioned along each ball screw of the ball screw assemblies 1604 and be coupled to the corresponding gear box 1612, 1620. The anti-reversing mechanism 1802 may function in substantially the same way as the anti-reversing mechanism 1002 discussed herein. Accordingly, the anti-reversing mechanism 1802 may utilize friction generated between a clutch, a rotating latch, and the corresponding ball screw to allow rotary ratcheting while the ball screw is rotating the raising direction but require sufficient torque to be input to the gear assembly to make the clutch of the anti-reversing mechanism 1802 slip in order to allow the ball screw to rotate in a lowering direction.

In addition to the anti-reversing mechanism 1802, one or more set pin 1650 may be selectively positioned through a side wall of the base 1628$a$, 1628$b$ at a location that may prevent the corresponding bracket 1704$a$, 1704$b$ from sliding towards the corresponding gear box 1612, 1620. Accordingly, the set pin 1650 may be selectively inserted by a user when the full vehicle lift 1600 is in the raised configuration to prevent the lift assembly 1600 from transitioning to a lowered configuration.

In use, the lift assembly 1600 may be positioned in a fully lowered configuration. In the fully lowered configuration, the lift arms are positioned adjacent to the corresponding base members. Further, in the fully lowered configuration the support pads and rollers are positioned just above the corresponding base. As such, the fully lowered position provides a minimal height of the lift assembly to allow vehicles or the like to become positioned over the lift assembly. The lift assembly may be transitioned to the fully lowered configuration from a raised configuration by rotating the input shaft in the lowering direction with either a cordless drill or the power unit.

Once the lift assembly 1600 is in the fully lowered configuration, or otherwise lowered so the support pads and rollers will not contact a vehicle driving thereover, a vehicle may drive over the lift assembly 1600 so the lift assembly is positioned at least partially under the body of the vehicle. Once properly positioned, a user may rotate the first gear box 1612 in the raising direction with a cordless drill or wirelessly with the power unit 118. Regardless, as the input shaft is rotated in the raising direction, corresponding rotary power is distributed to the first and second gear box, and in turn the corresponding ball screws, to move the screw nuts farther from the corresponding gear box. This movement of the screw nuts forces the lift arms to pivot outward relative to the lift base via pivotal contact with the linkages. The outward pivoting of the lift arms causes the corresponding support pads and rollers to become further spaced from the lift base as the drive shaft is rotated in the raising direction. The support pads and rollers will continue to raise until they contact an underside of the vehicle. Once the support pads and rollers contact the vehicle, further rotation of the drive shaft in the raising direction will lift the vehicle body away from the underlying ground. The lift assembly may be sized to sufficiently raise the vehicle body so that all of the vehicle wheels are at least partially spaced from the underlying surface.

The base 1628$a$, 1628$b$ may provide for a stable lifting surface even if the underlying ground uneven or otherwise unstable. More specifically, the base 1628$a$, 1628$b$ may be positioned between the movable components of the lift assembly 1600 and the underlying surface. As such, the substantially solid base 1628$a$, 1628$b$ may provide a solid foundation for the lift assembly 1600 even when it is positioned on uneven or unstable ground.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A vehicle lift assembly, comprising:

an input shaft;

a first ball screw coupled to rotate with the input shaft;

a ball screw nut coupled to a first bracket and configured to selectively move a lifting member based on rotation of the first ball screw, the first bracket coupled to a first ball bearing nut such that rotary motion of the first ball screw moves the first bracket to raise or lower a first support; and a power unit coupled to the input shaft, the power unit having a wireless transponder and configured to be selectively powered based on wireless signals received by the transponder from a remote device; and an anti-reversing locking mechanism comprising a clutch that selectively prevents the lifting member from lowering unless a torque is input through the input shaft a first gear box configured to transfer rotary motion from the input shaft to a first output coupled to the first ball screw and a second output coupled to a second ball screw;

a first lift base and a second lift base each having slots defined longitudinally along inner walls; and a second bracket coupled to a second ball bearing nut such that rotary motion of the second ball screw moves the second bracket to raise or lower a second support.

2. The vehicle lift assembly of claim 1, further wherein the input shaft is sized to be coupleable to a handheld cordless drill.

3. The vehicle lift assembly of claim 1, wherein the power unit is configured to selectively rotate the input shaft.

4. The vehicle lift assembly of claim 3, wherein the power unit comprises a battery to selectively rotate the input shaft based on wireless signals identified by the transponder from the remote device.

5. The vehicle lift assembly of claim 1, further comprising:

a second gear box coupled to an auxiliary output of the first gear box and configured to transfer rotary motion from the auxiliary output to a third output coupled to a third ball screw and a fourth output coupled to a fourth ball screw;

a third bracket coupled to a third ball bearing nut such that rotary motion of the third ball screw moves the third bracket to raise or lower a third support; and a fourth bracket coupled to the fourth ball bearing nut such that rotary motion of the fourth ball screw moves the fourth bracket to raise or lower a fourth support;

wherein the first and second gear boxes are coupled to one another to substantially simultaneously rotate the corresponding ball screws at the same rate based on the rotation of the input shaft.

* * * * *